(12) United States Patent
Huang et al.

(10) Patent No.: US 11,676,310 B2
(45) Date of Patent: Jun. 13, 2023

(54) SYSTEM AND METHODS FOR ENCODING OCTREE STRUCTURED POINT CLOUD DATA USING AN ENTROPY MODEL

(71) Applicant: UATC, LLC, San Francisco, CA (US)

(72) Inventors: Yushu Huang, Toronto (CA); Jerry Junkai Liu, Toronto (CA); Kelvin Ka Wing Wong, Toronto (CA); Shenlong Wang, Toronto (CA); Raquel Urtasun, Toronto (CA); Sourav Biswas, Toronto (CA)

(73) Assignee: UATC, LLC, Mountain View, CA (US)

( * ) Notice: Subject to any disclaimer, the term of this patent is extended or adjusted under 35 U.S.C. 154(b) by 336 days.

(21) Appl. No.: 17/018,349

(22) Filed: Sep. 11, 2020

(65) Prior Publication Data

US 2021/0150771 A1    May 20, 2021

Related U.S. Application Data

(60) Provisional application No. 62/936,428, filed on Nov. 16, 2019, provisional application No. 63/022,014, (Continued)

(51) Int. Cl.
*G06T 9/40* (2006.01)
*G06T 9/00* (2006.01)
(Continued)

(52) U.S. Cl.
CPC ............. *G06T 9/40* (2013.01); *B60W 40/10* (2013.01); *G01S 17/89* (2013.01); *G06N 3/084* (2013.01);
(Continued)

(58) Field of Classification Search
CPC ......... G06T 9/40; G06T 3/4046; G06T 9/002; G06T 9/001; G06T 17/005; B60W 40/10;
(Continued)

(56) References Cited

U.S. PATENT DOCUMENTS 11,275,673 B1 * 3/2022 Dolan ................. G06F 11/3664
2020/0304835 A1 * 9/2020 Liu ...................... G06N 3/0454
(Continued)

FOREIGN PATENT DOCUMENTS

WO    WO-2022150680 A1 * 7/2022

OTHER PUBLICATIONS

Balle et al, "End-to-End Optimized Image Compression", arXiv:1611v3, Mar. 3, 2017, 27 pages.
(Continued)

*Primary Examiner* — Charles T Shedrick
(74) *Attorney, Agent, or Firm* — Dority & Manning, P.A.

(57) ABSTRACT

The present disclosure is directed encoding LIDAR point cloud data. In particular, a computing system can receive point cloud data for a three-dimensional space. The computing system can generate a tree-based data structure from the point cloud data, the tree-based data structure comprising a plurality of nodes. The computing system can generate a serial representation of the tree-based data structure. The computing system can, for each respective node represented by a symbol in the serial representation: determine contextual information for the respective node, generate, using the contextual information as input to a machine-learned model, a statistical distribution associated with the respective node, and generate a compressed representation of the symbol associated with the respective node by encoding the symbol using the statistical distribution for the respective node. The computing system can generate a compressed bitstream by sequentially ordering a plurality of compressed representations associated with the plurality of symbols.

18 Claims, 9 Drawing Sheets

Related U.S. Application Data filed on May 8, 2020, provisional application No. 63/035,571, filed on Jun. 5, 2020.

(51) Int. Cl.
| | |
|---|---|
| G06T 3/40 | (2006.01) |
| B60W 40/10 | (2012.01) |
| G06N 5/046 | (2023.01) |
| G01S 17/89 | (2020.01) |
| G06N 3/084 | (2023.01) |

(52) U.S. Cl.
CPC ........... *G06N 5/046* (2013.01); *G06T 3/4046* (2013.01); *G06T 9/002* (2013.01)

(58) Field of Classification Search
CPC ....... G01S 17/89; G01S 7/4808; G06N 3/084; G06N 5/046; G06N 3/0445; G06N 3/08; G06N 3/0454; G06N 3/0472
See application file for complete search history.

(56) References Cited

U.S. PATENT DOCUMENTS

| | | | | |
|---|---|---|---|---|
| 2020/0327350 | A1* | 10/2020 | Anand | G06V 10/40 |
| 2020/0329258 | A1* | 10/2020 | Wang | G06N 3/084 |
| 2021/0004992 | A1* | 1/2021 | Flynn | G06F 17/18 |
| 2021/0150771 | A1* | 5/2021 | Huang | G06T 17/005 |

OTHER PUBLICATIONS

Balle et al, "Variational Image Compression with a Scale Hyperprior", arXiv:1802v2. May 1, 2018, 23 pages.
Behley et al, "SemanticKITTI: A Dataset for Semantic Scene Understanding of LiDAR Sequences", arXiv:1904v3, Aug. 16, 2019, 17 pages.
Bentley, "Multidimensional Binary Search Trees used for Associative Searching", Communications of the ACM, vol. 18, No. 9, Sep. 1975, 9 pages.
DeVillers et al, "Geometric Compression for Interactive Transmission", Institut National de Recherche en Informatique et en Automatique, 26 pages.
Djelouah et al., "Neural Inter-Frame Compression for Video Coding", International Conference on Computer Vision, Oct. 27-Nov. 2, 2019, Seoul, Korea, pp. 6421-6429.
Gailly et al., "zlib", www.zlib.net, Jan. 15, 2017, retrieved on Jul. 20, 2021, 5 pages.
Garcia et al, "Intra-Frame Context-Based Octree Coding for Point-Cloud Geometry", Proceedings Visualization 2000, Oct. 2018, 5 pages.
Garcia et al., "Context-Based Octree Coding for Point-Cloud Video", IEEE International Conference on Image Processing, Sep. 17-20, 2017, Beijing, China, 5 pages.
Garcia et al., "Geometiy Coding for Dynamic Voxelized Point Clouds using Octreee and Mulitple Contexts", IEEE Transactions on Image Processing, vol. 29, 2020, 10 pages.
Geiger et al, "Are We Ready for Autonomous Driving? The KITTI Vision Benchmark Suite", Conference on Image Processing, Oct. 2018, 8 pages.
Geiger et al., "Vision meets Robotics: The KITTI Dataset", International Journal of Robotics Research, vol. 14, No. 3, 6 pages.
Github.com, "Draco 3D Graphics Compression", https://github.com/google/draco, retrieved on Jan. 14, 2021.
Graham et al, "3D Semantic Segmentation with Submanifold Sparse Convolutional Networks", arXiv:1711.10275v1, Nov. 28, 2017, 11 pages.
Habibian et al, "Video Compression with Rate-Distortion Autoencoders", arXiv:1908v2, Nov. 13, 2019, 14 pages.
Houshiar et al, "3D Point Cloud Compression Using Conventional Image Compression for Efficient Data Transformation", International Conference on Information, Communication and Automation Technologies, Oct. 2015, 8 pages.
Huang et al, "A Generic Scheme for Progressive Point Cloud Coding", Transactions on Visualization and Computer Graphics, vol. 14, No. 2, 14 pages.
Huang et al., "3D Point Cloud Geometry Compression on Deep Learning", International Conference on Multimedia, Oct. 21-25, 2019, Nice, France, pp. 890-898.
Huang et al., "OctSqueeze: Octree-Structured Entropy Model for LiDAR Compression", Conference on Computer Vision and Pattern Recognition, Jun. 14-19, 2020, Virtual, pp. 1313-1323.
Kammerl et al, "Real-Time Compression of Point Cloud Streams", 2012 IEEE International Conference on Robotics and Automation, May 14-18, 2012, St. Paul, Minnesota, 8 pages.
Kingma et al., "Adam: A Method for Stochastic Optimization", arXiv:1412.6980v9, Jan. 30, 2017, 15 pages.
Klokov et al, "Escape from Cells: Deep Kd-Networks for the Recognition of 3D Point Cloud Models", arXiv:1704v2, Oct. 26, 2017, 10 pages.
Lang et al, "PointPillars: Fast Encoders for Object Detection from Point Clouds", arXiv:1812v2, May 7, 2019, 9 pages.
Liang et al., "PnPNet: End-to-End Perception and Prediction with Tracking in the Loop", arXiv:2005.14711v2, Jun. 27, 2020, 13 pages.
Lin et al., "M-LVC: Multiple Frames Prediction for Learned Video Compression", arXiv:2004.10290v1, Apr. 21, 2020, 14 pages.
LU et al, "DVC: An End-to-End Deep Video Compression Framework", arXiv:1812v3, Apr. 7, 2019, 14 pages.
Martin, "*Range encoding: an algorithm for removing redundancy from a digitized message", Video & Data Recording Conference, Jul. 24-27, 1979, Southhampton, England, 11 pages.
Maturana et al, "VoxNet: A 3D Convolutional Neural Network for Real-Time Object Recognition", 2015, 7 pages.
Meagher, "Geometric Modeling Using Octree Encoding", Computer Graphics and Image Processing, vol. 19, Jun. 1982, pp. 129-147.
Mekuria et al, "Design, Implementation, and Evaluation of a Point Cloud Codec for Tele-Immersive Video", Transactions on Circuits and Systems for Video Technology, vol. 27, 14 pages.
Mentzer et al, "Conditional Probability Models for Deep Image Compression", arXiv:1801v4, Jun. 4, 2019, 19 pages.
Mentzer et al, "Practical Full Resolution Learned Lossless Image Compression", arXiv:1811.12817v2, May 27, 2019, 14 pages.
Meyer et al., "LaserNet: An Efficient Probabilistic 3D Object Detector for Autonomous Driving", Conference on Computer Vision and Pattern Recognition, Jun. 16-20, 2019, Long Beach, CA, pp. 12677-12686.
Minnen et al., "Joint Autoregressive and Hierarchical Priors for Learned Image Compression", arXiv:1809.02736v1, Sep. 8, 2018, 22 pages.
Oord et al., "Conditional Image Generation with PixelCNN Decoders", arXiv:1606.05328v2, Jun. 18, 2016, 13 pages.
Oord et al., "Pixel Recurrent Networks", Proceedings of the 33rd International Conference on Machine Learning, vol. 48, 2016, 10 pages.
Oord et al., "WaveNet: a Generative Model for Raw Audio", arXiv:1609.03499v2, Sep. 19, 2016, 15 pages.
Paszke et al., "PyTorch: An Imperative Style, High-Performance Deep Learning Library", 33rd Conference on Neural Information Processing Systems (NeurIPS 2019), Dec. 8-14, 2019, Vancouver, Canada, 12 pages.
Qi et al., "PointNet: Deep Learning on Point Sets for 3D Classification and Segmentation", Conference on Computer Vision and Pattern Recognition, Jul. 21-26, 2017, Honolulu, Hawaii, pp. 652-660.
Qi et al., "PointNet++: Deep Hierarchical Feature Learning on Point Sets in a Metric Space", 31st Conference on Neural Information Processing Systems, Dec. 4-9, 2017, Long Beach, CA, 10 pages.
Qi et al., "Volumetric and Multi-View CNNs for Object Classification on 3D Data", Conference on Computer Vision and Pattern Recognition, Jun. 26-Jul. 1, 2016, Las Vegas, Nevada, pp. 5648-5656.

(56) References Cited

OTHER PUBLICATIONS

Quach et al., "Learning Convolutional Transforms for Lossy Point Cloud Geometry Compression", arXiv:1903.08548v2, May 22, 2019, 5 pages.
Queiroz et al., "Compression of 3D Point Clouds using Region-Adaptive Hierarchical Transform", IEEE Transactions on Image Processing, vol. 25, No. 8, Aug. 2016, 10 pages.
Ren et al., "SBNet: Sparse Blocks Network for Fast Inference", Conference on Computer Vision and Pattern Recognition, Jun. 18-22, 2018, Salt Lake City, Utah, pp. 8711-8720.
Riegler et al., "OctNet: Learning Deep 3D Representations at High Resolutions", Conference on Computer Vision and Pattern Recognition, Jul. 21-26, 2017, Honolulu, Hawaii, pp. 3577-3586.
Rippel et al., "Learned Video Compression", International Conference on Computer Vision, Oct. 27-Nov. 2, 2019, Seoul, Korea, pp. 3454-3463.
Scarselli et al., "The Graph Neural Network Model" IEEE Transactions on Neural Networks, vol. 20, No. 1, Jan. 2009, Jan. 2009, 20 pages.
Schnabel et al., "Octree-based Point-Cloud Compression", Proceedings of the $3^{rd}$ Eurographics/IEEE VGTC Conference on Point-Based Graphics, 2006, 11 pages.
Schwarz et al., "Emerging MPEG Standards for Point Cloud Compression", IEEE Journal on Emerging and Selected Topics in Circuits and Systems, vol. 9, No. 1, 2019, 16 pages.
Sergeev et al., "Horovod: fast and easy distributed deep learning in TensorFlow", arXiv:1802.05799v3, Feb. 21, 2018, 10 pages.
Shannon, "A Mathematical Theory of Communication", The Bell South Journal, vol. 27, Jul., Oct. 1948, 55 pages.
Shao et al., "Attribute Compression of 3D Point Clouds Using Laplacian Sparsity Optimized Graph Transform", IEEE Visual Communications and Image Processing (VCIP), Dec. 10-13, 2017, St. Petersburg, Florida, 4 pages.
Su et al., "Multi-view Convolutional Neural Networks for 3D Shape Recognition", International Conference on Computer Vision, Dec. 7-13, 2015, Santiago, Chile, pp. 945-953.
Thanou et al., "Graph-Based Motion Estimation and Compensation for Dynamic 3D Point Cloud Compression", International Conference on Image Processing, Sep. 27-30, 2015, Quebec City, Canada, pp. 3235-3239.
Theis et al., "Lossy Image Compression with Compressive Autoencoders", arXiv:1703.00395v1, Mar. 1, 2017, 19 pages.
Thomas et al., "KPConv: Flexible and Deformable Convolution for Point Clouds", International Conference on Computer Vision, Oct. 27-Nov. 2, 2019, Seoul, Korea, pp. 6411-6420.
Tian et al., "Geometric Distortion Metrics for Point Cloud Compression" IEEE International Conference on Image Processing, Sep. 17-20, 2017, Beijing, China, 7 pages.
Toderici et al., "Full Resolution Image Compression with Recurrent Neural Networks", Conference on Computer Vision and Pattern Recognition, Jul. 21-26, 2017, Honolulu, Hawaii, pp. 5306-5314.
Townsend et al., "Practical Lossless Compression with Latent Variables using Bits Back Coding", International Conference on Learning Representations, May 6-9, 2019, New Orleans, Louisiana, 13 pages.
Tu et al., "Compressing Continuous Point Cloud Data Using Image Compression Methods", 2016 IEEE 19th International Conference on Intelligent Transportation Systems (ITSC), Nov. 1-4, 2016, Rio de Janeiro, Brazil, pp. 1712-1719.
Tu et al., "Point Cloud Compression for 3D LiDAR Sensor using Recurrent Neural Network with Residual Blocks", International Conference on Robotics and Automation (ICRA), May 20-24, 2019, Montreal, Canada, 7 pages.
Tu et al., "Real-time Streaming Point Cloud Compression for 3D LiDAR Sensor Using U-net", IEEE Access, vol. 7, Aug. 14, 2019, 10 pages.
Wang et al., "Deep Parametric Continuous Convolutional Neural Networks", Conference on Computer Vision and Pattern Recognition, Jun. 18-22, 2018, Salt Lake City, Utah, pp. 2589-2597.
Wang et al., "Learned Point Cloud Geometry Compression", arXiv:1909.12037v1, Sep. 26, 2019, 13 pages.
Wang et al., "O-CNN: Octree-based Convolutional Neural Networks for 3D Shape Analysis", arXiv:1712.01537v1, Dec. 5, 2017, 11 pages.
Witten et al., "Arithmetic Coding for Data Compression", Communications of the ACM, vol. 30, No. 6, Jun. 1987, pp. 520-540.
Wong et al., "Identifying Unknown Instances for Autonomous Driving", 3rd Conference on Robot Learning (CoRL 2019), Oct. 30-Nov. 1, 2019, Osaka, Japan, 10 pages.
Wu et al., "3D ShapeNets: A Deep Representation for Volumetric Shapes", Conference on Computer Vision and Pattern Recognition, Jun. 7-12, 2015, Boston, MA, pp. 1912-1920.
Wu et al., "PointConv: Deep Convolutional Networks on 3D Point Clouds", Conference on Computer Vision and Pattern Recognition, Jun. 16-20, 2019, Long Beach, CA, 10 pages.
Wu et al., "Video Compression through Image Interpolation", European Conference on Computer Vision, Sep. 8-14, 2018, Munich, Germany, 16 pages.
Xiong et al., "Deformable Filter Convolution for Point Cloud Reasoning", arXiv:1907.13079v1, Jul. 30, 2019, 12 pages.
Yan et al., "Deep AutoEncoder-based Lossy Geometry Compression for Point Clouds", arXiv:1905.03691v1, Apr. 18, 2019, pp. 4321-4328.
Yang et al., "Learning for Video Compression with Hierarchical Qualify and Recurrent Enhancement", arXiv:2003.01966v7, Aug. 3, 2020, 14 pages.
Yang et al., "PIXOR: Real-time 3D Object Detection from Point Clouds", C, Jun. 18-22, 2018, Salt Lake City, Utah, pp. 7652-7660.
Yedidia et al., "Generalized Belief Propagation", Proceedings of the 13th International Conference on Neural Information Processing Systems, Jan. 2000, Denver, Colorado 7 pages.
Zaheer et al., "Deep Sets", 31st Conference on Neural Information Processing Systems, Dec. 4-9, 2017, Long Beach, CA, 11 pages.
Zhang et al., "Efficient Convolutions for Real-Time Semantic Segmentation of 3D Point Clouds", International Conference on 3D Vision (3DV), Sep. 5-8, 2018, Verona, Italy, 10 pages.
Zhang et al., "Point Cloud Attribute Compression with Graph Transform", IEEE Institute of Electrical and Electronics Engineers, 2014, pp. 2066-2070.
Zhou et al., "VoxelNet: End-to-End Learning for Point Cloud Based 3D Object Detection", arXiv:1711.06396v1, Nov. 17, 2017, 10 pages.

* cited by examiner

SYSTEM AND METHODS FOR ENCODING OCTREE STRUCTURED POINT CLOUD DATA USING AN ENTROPY MODEL

RELATED APPLICATION

This application claims priority to and the benefit of U.S. Provisional Patent Application No. 62/936,428, filed Nov. 16, 2019, U.S. Provisional Patent Application No. 63/022,014, filed May 8, 2020, and U.S. Provisional Patent Application No. 63/035,571, filed Jun. 5, 2020 which are hereby incorporated by reference in its entirety.

FIELD

The present disclosure relates generally to autonomous vehicles. More particularly, the present disclosure relates to encoding data captured by the sensors of an autonomous vehicle.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. The sensors produce a very large amount of data. To quickly and efficiently capture and process the data, the autonomous vehicle can store the data in a manner that minimizes the space needed.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method can include receiving, by a computing system including one or more processors, point cloud data for a three-dimensional space. The method can include generating, by the computing system, a tree-based data structure from the point cloud data, the tree-based data structure comprising a plurality of nodes organized in a hierarchical structure, each node representing a particular area of the three-dimensional space. The method can include generating, by the computing system, a serial representation of the data by traversing the tree-based data structure and adding a plurality of symbols to a serial data structure, each symbol representing a node in the tree-based data structure. The method can include for each respective node represented by a symbol in the serial representation: determining, by the computing system, contextual information for the respective node, generating, by the computing system and using the contextual information as input to a machine-learned model, a statistical distribution associated with the respective node, and generating, by the computing system, a compressed representation of the symbol associated with the respective node by encoding the symbol using the statistical distribution for the respective node. The method can include generating, by the computing system, a compressed bitstream by sequentially ordering a plurality of compressed representations associated with the plurality of symbols.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which refers to the appended figures, in which.

DETAILED DESCRIPTION

Figure 1:
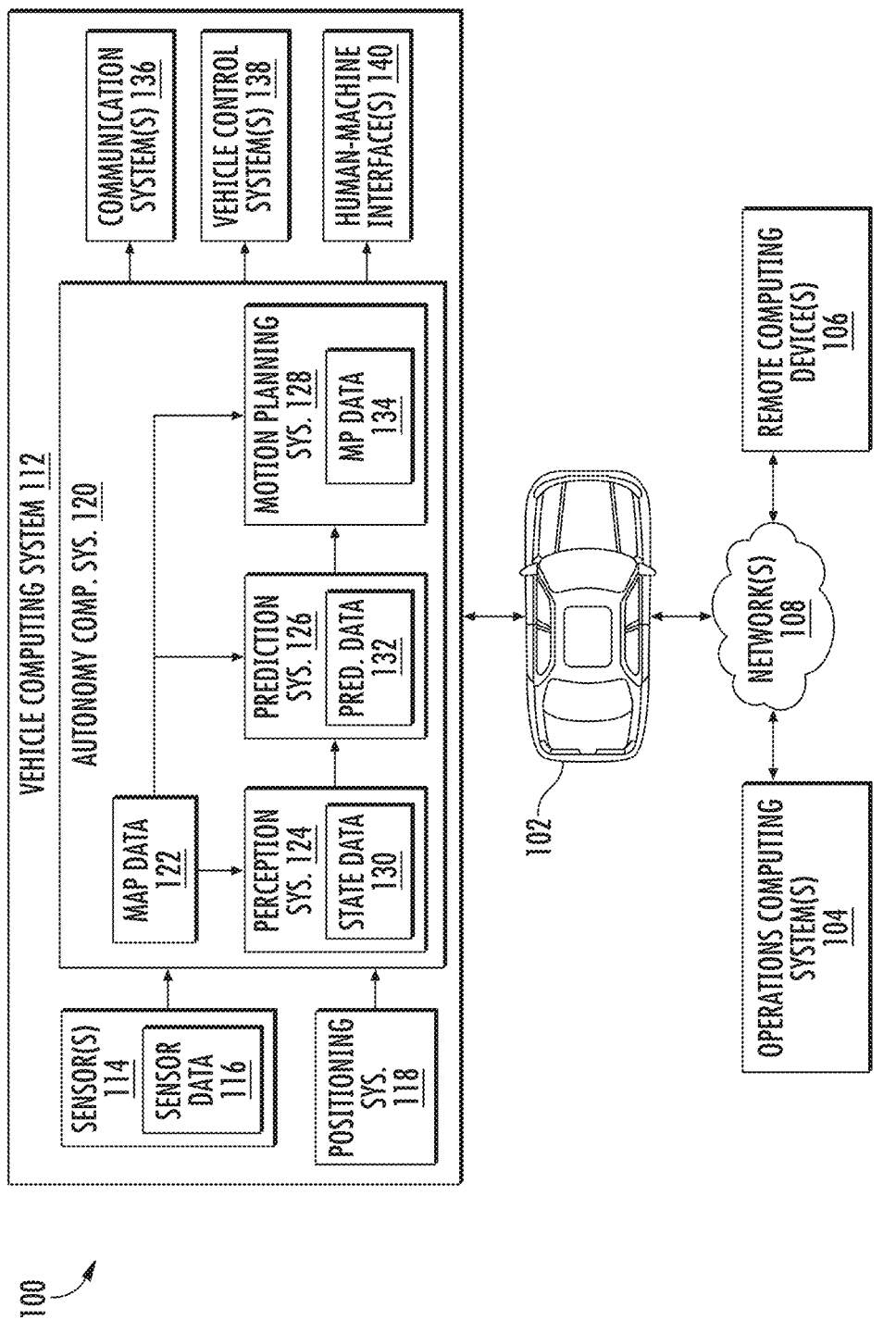
FIG. 1 depicts a block diagram of an example autonomous vehicle according to example embodiments of the present disclosure.

Generally, the present disclosure is directed to systems and methods for generating a compressed and encoded representation of point cloud (e.g., LIDAR) data. To achieve this goal, a system can receive point cloud data from a LIDAR system (e.g., of an autonomous vehicle, another robotic system, etc.). The system can parse the point cloud data to generate a tree-based data structure (an octree in this case). The tree-based data structure can include a plurality of nodes, each node representing a particular portion of a three-dimensional space that includes the point cloud data. In addition, the nodes can be organized into a hierarchical structure, with the child nodes of a parent node representing a subarea of the area represented by the parent node. The system can then create a sequential representation of the nodes of the tree by traversing the tree and adding a symbol for each node into the sequential representation.

The sequential representation can include a plurality of symbols, each symbol representing a node in the tree-based data structure. The system can then determine, for each respective symbol, contextual information. The contextual information can include, but is not limited to, the octant value of the respective symbol, the location of the respective symbol, the level of the respective symbol in the tree-based data structure, and the occupancy value of the parent node associated with the respective symbol. This contextual information can then be used as input into a machine-learned model (a multi-layer perceptron) that can produce, as output, a statistical distribution for the expected occupancy for the respective node. The statistical distribution is a representation of the likelihood that the respective symbol has a particular value (e.g., an 8-bit value in this case). The system can then encode each symbol in the sequential representation based on the statistical distribution for that symbol to generate a compressed bitstream representation of the point cloud data. This bitstream can be transmitted to another system or stored for later analysis. For example, the data encoding system can be included in an autonomous vehicle to process, encode, and store the data captured by the LIDAR sensors included in the autonomous vehicle. When needed, the data can be decoded and analyzed to be used by the autonomous vehicle or for later analysis.

The following describes the technology of this disclosure within the context of an autonomous vehicle for example purposes only. As described herein, the technology described herein is not limited to an autonomous vehicle and can be implemented within other robotic and computing systems.

An autonomous vehicle can include a vehicle computing system. The vehicle computing system can be responsible for, among other functions, creating the control signals needed to effectively control an autonomous vehicle. The vehicle computing system can include an autonomy computing system. The autonomy computing system can include one or more systems that enable the autonomous vehicle to plan a route, receive sensor data about the environment, perceive objects within the vehicle's surrounding environment (e.g., other vehicles), predict the motion of the objects within the surrounding environment, generate trajectories based on the sensor data, and perception/predicted motion of the objects, and, based on the trajectory, transmit control signals to a vehicle control system and thereby enable the autonomous vehicle to move to its target destination. To accomplish these operations, the autonomy computing system can include, for example, a perception system, a prediction system, and a motion planning system.

To help maintain awareness of the vehicle's surrounding environment, the vehicle computing system (e.g., the perception system) can access sensor data from one or more sensors to identify static objects and/or dynamic objects (actors) in the autonomous vehicle's environment. To help determine its position within the environment (and relative to these objects), the vehicle computing system can use a positioning system and/or a communication system to determine its current location. Based on this location information, the vehicle computing system can access map data (e.g., HD map data, etc.) to determine the autonomous vehicle's current position relative to other objects in the world (e.g., bicycles, pedestrians, other vehicles, buildings, etc.), as well as map features such as, for example, lane boundaries, curbs, and so on.

The vehicle computing system (e.g., the perception system) can utilize the sensor data to identify one or more objects in the local environment of the autonomous vehicle. The sensor data can include, but is not limited to, data acquired via: camera sensors, LIDAR sensors, and RADAR sensors. LIDAR sensors can generate a large amount of data. Such a large amount of data can be difficult to store or transmit. As such, the perception system (and/or another component of the vehicle computing system in communication with the perception system) can transmit point cloud data generated by a LIDAR sensor to a data encoding system. The data encoding system can encode and thereby compress the LIDAR point cloud data. The encoded and compressed data can be stored until needed by, or transmitted to, the perception system and/or another system onboard the autonomous vehicle.

The vehicle computing system can decode the stored LIDAR data. For example, using the decoded LIDAR data and other sensor data, the vehicle computing system can generate perception data that describes one or more object(s) in the vicinity of the autonomous vehicle (e.g., current location, speed, heading, shape/size, etc.).

The generated perception data can be utilized to predict the future motion of the object(s). For example, the vehicle computing system (e.g., the prediction system) can use the perception data to generate predictions for the movement of one or more objects as an object trajectory including one or more future coordinates/points. In some implementations, the perception and prediction functions of the vehicle computing system can be included within the same system.

The vehicle computing system (e.g., motion planning system) can use the perception data, prediction data, map data, and/or other data to generate a motion plan for the vehicle. For example, a route can describe a specific path for the autonomous vehicle to travel from a current location to a destination location. The vehicle computing system can generate potential trajectories for the autonomous vehicle to follow as it traverses the route. Each potential trajectory can be executable by the autonomous vehicle (e.g., feasible for the vehicle control systems to implement). Each trajectory can be generated to comprise a specific amount of travel time (e.g., eight seconds, etc.)

The autonomous vehicle can select and implement a trajectory for the autonomous vehicle to navigate a specific segment of the route. For instance, the trajectory can be translated and provided to the vehicle control system(s) that can generate specific control signals for the autonomous vehicle (e.g., adjust steering, braking, velocity, and so on). The specific control signals can cause the autonomous vehicle to move in accordance with the selected trajectory.

The technology of the present disclosure can help improve the efficiency of this autonomy process of an autonomous vehicle (or another type of computing system). More specifically, the data encoding system (described herein) can follow a specific process to take input point cloud data from a LIDAR sensor and generate an encoded final bitstream. The data encoding system can receive input LIDAR point cloud from a LIDAR sensor included in an autonomous vehicle. The point cloud can represent a plurality of points in a three-dimensional space. The LIDAR can gather this information by projecting electromagnetic waves (e.g., laser pulses) out away from the sensor, receiving some of these waves as they are reflected back to the sensor from objects in the world, and determining the distance from the sensor at which the electromagnetic wave was reflected based on the delay between when the electromagnetic wave was transmitted and when it was received, among other factors.

This process results in a plurality of points, each point representing the place at which an electromagnetic wave was reflected back to the sensor. Depending on the configuration of the LIDAR sensor and the number of objects in the area of the autonomous vehicle, a large number of points may exist in the point cloud data. Thus, efficient storage or transmission of the LIDAR data can include processing to reduce the size of the data. For example, the data can be encoded and/or compressed so that it can be more easily transmitted between systems and requires less storage space. In addition, the data can also be stored for later analysis.

The data encoding system can receive the point cloud data from the LIDAR sensor. Once the point cloud data has been received, the data encoding system can parse the point cloud data to generate a tree-based data structure for representing and/or storing the point cloud data. In some examples, the tree-based data structure may be an octree wherein each node can have up to eight child nodes with which it is associated. It should be noted that leaf nodes (e.g., the bottom nodes in the tree-based structure) do not have any associated child nodes (which is what makes them leaf nodes).

In some examples, the tree-based data structure can be generated by subdividing the entire three-dimensional space into eight equal sub-areas (octants). Thus, an initial node of the tree-based data structure can represent the entire space represented by the point cloud data, and each of the eight sub-areas can be represented by a child node of the initial node (e.g., a level below the initial node and associated with the initial node in the hieratical structure). In some examples, the initial node can have an associated eight-bit value with each bit representing the occupancy of each of the eight sub-areas. A sub-area can be determined to be occupied if at least one point in the point cloud data is within the sub-area.

Once the tree-based structure has been generated, the data encoding system can serialize the data within the tree-based structure. To generate a serialized representation of the tree-based structure, a serialization system can traverse the tree-based structure and generate a symbol representing each node for use in a serialized data structure. The symbol can be the eight-bit value (as noted above) that is associated with a respective node and represents the occupancy of the child nodes of the respective node. In some examples, the nodes can be traversed in a breadth-first manner. A breadth-first traversal of an octree can include accessing each node on a particular level of the tree-based structure and adding a symbol representing them to the serial data structure before accessing any nodes from a lower level. In other examples, a depth-first traversal method or another traversal method can be used.

In some examples, the data encoding system can generate contextual information for each node in the tree-based structure. Contextual information is information that can be generated for a particular node without the content of the node itself. Contextual information can include a level in the tree-based data structure associated with the node. For example, the initial node can have a level value of 1 (or 0). The child nodes of the initial node can have a level value of 2 (or 1), and so on. Context information can further include the parent occupancy values for the current node. This information can be represented as an eight-bit value associated with the parent node. The eight-bit value can represent the occupancy of each of the eight sub-areas associated with that parent node. For example, a "1" can represent that the associated sub-area is occupied and a "0" can indicate that the associated sub-area is not occupied.

The contextual information can also include an octant index for the respective node. The octant index can include a value between 0 and 7, wherein the value represents the respective node's position within the eight child nodes associated with the parent node. Thus, the first child node can have an octant index of zero and the last child node can have an octant index of seven. The octant index values can represent the same sub-areas of each node regardless of which node is in question. Thus, the first child node (e.g., octant index 0) can be the front top right sub-area of the parent node. Any method for associating octant index values with particular sub-areas within the parent can be used so long as it is kept consistent throughout all nodes.

The contextual information can include identifying the particular space associated with the respective node. For example, the contextual information can include information indicating which area of the three-dimensional space is represented by the node. In some examples, this information can be determined based on the position of the parent node and the octant index value for the respective number.

Once the contextual information has been calculated by the data encoding system, that information can be used as input to an entropy model. In some examples, the entropy model can be referred to as a tree-based structured deep entropy model. The entropy model can include multiple multi-layered perceptrons (MLPs). For example, the entropy model can be a stacked-entropy model with multiple MLPs that receive the output of a previous MLP and generate output that may be used as input to a subsequent MLP.

Specifically, the entropy model can include multiple MLP layers. The first MLP can be a 5-layer MLP with 128-dimensional hidden features. All subsequent MLPs can be 3-layer MLPs (with residual layers) with 128-dimensional hidden features. A final linear layer followed by a soft-max is used to make a 256-way prediction. The 256-way prediction can represent the likelihood, for a respective node of each potential eight-bit value, that the symbol associated with the respective node has that potential eight-bit value.

For example, using a particular eight-bit symbol (e.g., representing a node) in a plurality of eight-bit symbols as input, the goal of a multi-layer perceptron system 616 can be to generate an estimate distribution $q(x_n)$ for the particular symbol $x_n$ that minimizes the difference (or cross-extropy) with the actual distribution of symbols for the particular symbol $p(x_n)$ as represented above.

These MLPs can take advantage of the tree structure to gather both the information from nodes at coarser levels and the contextual information available at the current node. Intuitively, conditioning on ancestor nodes can help to reduce the entropy for the current node prediction, since it is easier to predict the finer geometry structure at the current node when the coarse structure represented by ancestor nodes is already known. Context information such as location information can help to reduce entropy even further by capturing the prior structure of the scene. For instance, in the setting of using LiDAR data in the self-driving scenario, an occupancy node 0.5 meters above the LiDAR sensor is unlikely to be occupied.

The entropy model can model the estimated distribution ($q_i$ ($x_i|x_{an(i)}$; $c_i$; w)) by first extracting an independent contextual embedding for each node i ($x_i$) and then performing progressive aggregation of contextual embeddings to incorporate ancestral information $x_{an(i)}$ for a given node.

For a given intermediate octree node $x_i$, the input contextual information (also referred to as a context feature) $c_i$ can include the octree level, parent byte, octant index, and spatial location of the node's octant. The entropy model can extract an independent deep feature for each node through a multilayer perceptron (MLP) with the context feature $c_i$ as input:

$$h_i^{(0)} = MLP^{(0)}(c_i)$$

Then, starting with the feature $h_i^{(0)}$ for each node, we perform K aggregations between the current node feature and the feature of its parent. At iteration k, the aggregation can also be modeled as an MLP:

$$h_i^{(k)} = MLP^{(k)}([h_i^{k-1}], [h_{pa(i)}^{k-1}])$$

where $h_{pa(i)}^{(k-1)}$ is the hidden feature of node i's parent node. For the root node, we consider its parent feature as all zero features for model consistency. The final output of the entropy model is a linear layer on top of the K-th aggregated feature $h_i^{(k)}$ producing a 256-dimensional softmax of probabilities for the 8-bit occupancy symbol of the given node:

$$q_i(\cdot | = x_{an(i)}, c_i; w) = g(h_i^k)$$

Note that these aggregations may only aggregate the node feature of a respective node with that of its parent node, and never its child node. The child input contextual information may not be available during sequential decoding. Moreover, each additional aggregation can increase the receptive field of ancestral features by 1, and so the k-th aggregation has a receptive field of k ancestors. In some examples, the entropy model can be a stacked entropy model with K=3. Using this configuration, a model with K levels of aggregations can predict the probability of the current node ($x_i$) by considering the node feature itself as well as K−1 generations of the ancestor's feature.

Thus, this entropy model can be an autoregressive model that is applied along the tree traversal path from the root to each node. The resulting output can be an estimated distribution for each node (and its associated symbol in the linear representation). The estimated distribution can be used by the data encoding system to generate an encoded bitstream representation of the original point cloud data.

At the encoding stage, the data encoding system can apply the encoding model sequentially across different levels of the tree-based data structure, from the initial node to the leaf nodes. Because the entropy model does not propagate information, the data encoding system can parallelize the computation for probability estimation. The encoding system can use the resulting estimated distribution to losslessly compress the raw sequential stream of symbols representing the nodes of the tree-based structure using an entropy coding algorithm such as arithmetic coding. By using the estimated distribution for each byte ($x_i$) in the sequence to predict the categorical distribution (0 to 255), the arithmetic encoding model can generate a compressed representation of the bitstream that is smaller than a compressed version that used the same estimated distribution for all symbols.

To decode, the same entropy model can be used in the arithmetic coder's decoding algorithm. A tree-based data structure can then be built from the decompressed bitstream and used to reconstruct the point cloud. Due to the autoregressive nature of the entropy model, each node probability estimation may only depend on itself and decoded node features at a higher level of the octree. In addition, the tree-based data structure can be serialized in a breadth-first search fashion. As a result, given a node $x_i$, its ancestors in the entropy model $x_{an(i)}$ are decoded before $x_i$, making it feasible for the decoder to generate the node probability estimation for that node.

In some examples, the data encoding system can use additional information to improve the efficiency of encoding captured point cloud data. In some examples, the data encoding system can access both occupancy data from a LIDAR point cloud and an intensity value for each point. The intensity data can be, for example, a measure, collected for every point, of the return strength of the laser pulse that generated the point. It can be based, in part, on the reflectivity of the object struck by the laser pulse.

Thus, the data encoding system can quantize and encode the point cloud data into an octree representation where leaves represent the quantized points and intermediate nodes contain 8-bit symbols representing child occupancies. Leaf nodes in the octree structure can represent specific points in the point cloud. Each point can include the intensity of the point and the offset value of the point. The offset value can represent the distance between a given point in the point cloud and the corner position.

A deep entropy model, as discussed above, can use contextual information (e.g., spatio-temporal context) to generate a statistical distribution for each node that is predictive of the occupancy of that node. In addition, the deep entropy model can generate predictive information of the intensity values for each point for intensity compression. Thus, the data encoding system can encode both occupancy data and intensity data.

The data encoding system can serialize the octree into two different uncompressed byte streams by traversing the octree in breadth-first order. The first byte stream can contain the intermediate node occupancy symbols in breadth-first order, and the second byte stream can contain the leaf nodes with intensity values and offset values for each point in the point cloud data. The two byte streams can be represented by $P^{(t)} = (X^{(t)}, R^{(t)})$, where $X^{(t)} = \{x_1^{(t)}, \ldots, x_{mt}^{(t)}\}$ is the set of occupancy symbols, and $R^{(t)} = \{r_1^{(t)}, \ldots, r_{nt}^{(t)}\}$ is the set of intensities.

The two octree byte sequences can be used as input to an entropy encoding model. The entropy encoding model can be a probability model that generates statistical distribution data for the points in the point cloud.

In some examples, the data encoding system can make a 1st-order Markov assumption: a given octree $P^{(t)}$ only depends on the sweep preceding it, $P^{(t-1)}$. The octree can then be factored into two entropy models: the node occupancy mode $p(X^{(t)}|P^{(t-1)}; w)$, and the intensity model $p(R^{(t)}|X^{(t)}|P^{(t-1)}; w)$ conditioned on occupancies.

The dependence on past sweeps can enable the model to be applicable to an online LiDAR stream setting. The data encoding system can factorize the occupancy probabilities using the following formula:

$$p(X^{(t)} | \mathcal{P}^{(t-1)}; w) = \prod_i p(x_i^{(t)} | X_{ans(i)}^{(t)}, \mathcal{P}^{(t-1)}; w)$$

In this example, $X_{ans(i)}^{(t)} = \{X_{pa(i)}^{(t)}, X_{pa(pa(i))}^{(t)}, \ldots, X_{pa(\ldots(pa(i)))}^{(t)}\}$ represents the set of ancestor nodes of $X_1^{(t)}$ and $P^{(t-1)}$ represents the point cloud from previous sweep. As seen above, the data encoding systems can simplify the autoregressive dependency on ancestor nodes on the octree for the given timestamp, as well as all the nodes at the previous timestamp. The data encoding system can model $p(|X_{ans(i)}^{(t)}, P^{(t-1)}; w)$ with a deep neural network. The architecture has two backbones, namely the ancestral node dependence module which encodes recurrent dependencies on the ancestor nodes $X_{ans(i)}^{(t)}$ from the current sweep's octree as well as a prior octree dependence module which models information passed from the previous sweep.

In addition to generating statistical data based on the feature data associated with nodes higher in the tree hierarchy, the data encoding system can incorporate data from octrees associated with previous sweeps of the LIDAR. A sweep can represent a single 360-degree pass of the LIDAR sensor. The data encoding system can incorporate the previous octree P(t−1) into the current entropy model at time t through a temporal octree dependence module. In some examples, the previous octree can be aligned into the sensor coordinate frame of the current octree.

Unlike the current octree where the data encoding system only has access to parental information, the data encoding system (or a data decoding system) can access all information within the previous octree, containing both top-down ancestral information as well as bottom-up child information. The data encoding system can exploit this fact via a two-stream feature backbone to compute embeddings for every octree node at time t−1. After a forward pass to generate statistical distribution data based on the features of the parent nodes, the data encoding system can perform a bottom-up aggregation pass using a recurrent network that produces aggregated features from descendants to the current node. Unlike the ancestral module in which each node only has one parent, the number of children per node can vary. Thus, the data encoding system can resolve this by using the following function:

$$g_{j|}^{(t-)} = f_{agg,1}(h_j^{(t-1)} + \Sigma_{c \in child(j)} f_{agg,2}(g_c^{(t-1)}))$$

which produces the final embedded feature containing both top-down and bottom-up context.

The data encoding system can incorporate the set of aggregated features in the previous octree $\{g_j^{(t-1)}\}$, with ancestral features in the current octree $\{h_j^{(t)}\}$ to help with occupancy prediction in the current octree. In some examples, only a subset of spatially proximal nodes in the previous sweep can contribute to better prediction for a given node at time t. Furthermore, the relative location of each neighbor should define its relative importance. The data encoding system can employ continuous convolutions to process previous octree features at the current node. A continuous conv. layer can aggregate features from neighboring points to a given node in the following manner: $h_i = \Sigma_{j \in N(i)} \sigma(p_j - p_i) h_j$ where N(i) is the i-th node's k-nearest neighboring nodes in 3D space from the (t−1) sweep, at the same level as i, and $p_i$ is the 3D position of each node.

The data encoding system can apply a separate MLP with a continuous convolution layer per octree level to process the aggregated features in the previous octree $\{g_j^{(t-1)}\}$ j∈N(i) and produce an embedding feature $g_{i,st}^{(t)}$.

The data encoding system can use the intensity entropy model to compress extraneous intensities tied to each spatial point coordinate. Assuming these intensities are bounded and discrete, the data encoding system can factorize using the following formula:

$$p(\mathcal{R}^{(t)} | \mathcal{X}^{(t)}, \mathcal{P}^{(t-1)}; w) = \prod_i p(r_i^{(t)} | \mathcal{X}^{(t)}, \mathcal{P}^{(t-1)}; w)$$

The conditioning on the occupancies $X^{(t)}$ can emphasize that intensity decoding occurs after the point spatial coordinates have already been reconstructed in $R^3$. Therefore, the data encoding system can directly make use of the spatial position corresponding to each intensity $R_i^{(t)}$ in compression.

The data encoding system can leverage temporal correlations between point intensities across consecutive timestamps to better model the entropy of $r_i^{(t)}$. Similar to node occupancy prediction above, the data encoding system can employ continuous convolutions to incorporate previous intensity information when there are not direct correspondences between the current point cloud and the previous point cloud. For example, let $R_{N(i)}$ be the set of nearest neighbor intensities $\{r_j^{(t-1)}\}$ j∈N(i), where nearest neighbor is defined by spatial proximity of previous point j to the current point i. The data encoding system can apply an MLP with a continuous conv. layer that takes the past intensities $r_j^{(t-1)}$ as input and outputs an embedding feature for each node i. This feature can be fed through a linear layer and softmax to output intensity probability values. In some examples, the intensity value is an 8-bit integer, so the resulting probability vector is 256-dimensional $p(r_i^{(t)} | X^{(t)} | P^{(t-1)}; w))$.

The data encoding system can then encode the byte streams using the entropy model discussed above to produce a compressed bitstream. The same entropy models can be used to decode the compressed bitstream and generate the original octree data.

The following provides an end-to-end example of the technology described herein. An autonomous vehicle can travel through a particular three-dimensional space. As the autonomous vehicle passes through the three-dimensional space, it gathers point cloud data for the three-dimensional space using a LIDAR sensor.

A data encoding system can receive point cloud data for the three-dimensional space. The point cloud data can be generated via a LIDAR sensor associated with an autonomous vehicle.

The data encoding system can generate a tree-based data structure from the point cloud data. The tree-based data structure can include a plurality of nodes organized in a hierarchical structure, each node representing a particular area of the three-dimensional space. To do so, the data encoding system can establish an initial node representing the three-dimensional space represented by the point cloud data. The data encoding system can divide the three-dimensional space into eight sub-areas.

For each respective sub-area, the data encoding system can determine whether the respective sub-area includes at least one point in the point cloud data. In response to determining that the sub-area includes at least one point in the point cloud data, the data encoding system can add a node representing the respective sub-area as a child node of the initial node in the tree-based data structure. The data encoding system can determine whether the respective sub-area includes more than one point in the point cloud data. In response to determining that the sub-area includes at least on point in the point cloud data, the data encoding system can recursively subdivide the respective sub-areas of the child nodes until no resulting child nodes are associated with a sub-area that represent more than one point in the point cloud data.

In some examples, the tree-based data structure can be structured such that each node in the tree-based data structure has a parent node and one or more children nodes. The tree-based data structure can be an octree that is structured such that each node has up to eight child nodes. Using an octree can be especially advantageous because the number of nodes matches well with dividing the three-dimensional space into eight equally spaced sub-areas.

In some examples, a respective node is associated with an area in the point cloud data and any child nodes of the respective node are associated with a sub-area within the area associated with the respective node.

The data encoding system can generate a serial representation of the data by traversing the tree-based data structure and adding a plurality of symbols to a serial data structure, each symbol representing a node in the tree-based data structure. The serial representation can be a stream of bytes (one 8-bit symbol associated with each node). In some examples, each symbol is an eight-bit value representing the occupancy of eight sub-areas within the area represented by the respective node. The tree-based structure can be traversed in a breadth-first manner. A breadth-first traversal of a tree is a traversal that accesses each node at a particular level before moving to lower levels. The depth-first traversal of a tree is a traversal that recursively accesses the child nodes of each node before moving onto other nodes in the same level.

For each respective node represented by a symbol in the serial representation, the data encoding system can determine contextual information for the respective node. The contextual information can include at least one of: a location represented by the respective node, an index of the respective node, a level of the respective node in the tree-based structure, or occupancy data of the parent node of the respective node.

The data encoding system can generate, using the contextual information as input to a machine-learned model, a statistical distribution associated with the respective node. In some examples, the machine-learned model is a multi-layer perceptron. Intermediate layers in the multi-layer perceptron can produce an intermediate representation of the contextual information that is usable as input to subsequent layers in the multi-layer perceptron.

In some examples, the multi-layer perceptron can include a plurality of levels. The data encoding system can aggregate an intermediate representation of the contextual information of at least one parent node of the respective node with intermediate representations of the respective node as the input to a layer in the multi-layer perceptron. In some examples, the multi-layer perceptron can comprise three layers.

The data encoding system can generate a compressed representation of the symbol associated with the respective node by encoding the symbol using the statistical distribution for the respective node. The data encoding system can generate a coded version of the respective symbol using an entropy encoder. In some examples, the entropy encoder can use an adaptive arithmetic encoding algorithm.

The data encoding system can generate a compressed bitstream by sequentially ordering a plurality of compressed representations associated with the plurality of symbols. In some examples, the compressed bitstream is stored for later analysis. In response to a request to analyze the compressed bitstream, the data encoding system can decode the compressed bitstream to extract the tree-based data structure.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

The systems and methods described herein provide a number of technical effects and benefits. More particularly, the systems and methods of the present disclosure provide improved techniques for encoding point cloud data gathered by LIDAR sensors for use in an autonomous vehicle. For instance, the data encoding system (and its associated processes) can, by using a machine-learned model to efficiently identify node-specific estimated statistical distributions, efficiently encode the point cloud data (which has been organized into an octree (or other tree-based data structure). Doing so reduces the amount of memory needed to store and/or transmit the point cloud data generated via the LIDAR sensor. In addition, by using an efficient entropy encoding method, the data encoding system reduces the number of processing cycles necessary to achieve the desired compression. Reducing the amount of data storage required and reducing the number of processing cycles, reduces the cost of running the system and reduces the amount of energy used by the system, all other things being equal. Reducing energy consumption increases the useful battery life of any battery systems included in the autonomous vehicle.

Furthermore, efficient encoding and decoding of sensor data can increase the speed and accuracy of data analysis. Faster and more efficient analysis can ensure that an autonomous vehicle correctly identifies any objects in its vicinity. Doing so allows autonomous vehicles to be controlled in a manner that is both safer and more efficient.

Various means can be configured to perform the methods and processes described herein. For example, a computing system can include a reception unit(s), generation unit(s), statistical distribution determination unit(s), encoder unit(s), and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to receive point cloud data for a three-dimensional space. For example, a LIDAR sensor associated with an autonomous vehicle can capture point cloud data for a space around the autonomous vehicle and provide that data to a data encoding system. A reception unit is one example of a means for receiving point cloud data for a three-dimensional space.

The means can be configured to generate a tree-based data structure from the point cloud data. The tree-based data structure can include a plurality of nodes organized in a hierarchical structure. Each node can represent a particular area of the three-dimensional space. For example, the data encoding system can divide the original three-dimensional space into eight sub-areas. Each sub-area can then be divided further into sub-areas if the sub-area is determined to include at least one point from the data point cloud data. The areas can be recursively divided until either a minimum size is reached or until only one point is represented by any sub-area node. A generation unit is one example of a means for generating a tree-based data structure from the point cloud data, the tree-based data structure comprising a plurality of nodes organized in a hierarchical structure, each node representing a particular area of the three-dimensional space.

The means can be configured to generate, using contextual information as input to a machine-learned model, a statistical distribution associated with the respective node. For example, the data encoding system can use a model to determine, for each node, an estimated statistical distribution associated with that node. A statistical distribution determination unit is one example of a means for generating, using contextual information as input to a machine-learned model, a statistical distribution associated with the respective node.

The means can be configured to generate a compressed bitstream by sequentially ordering a plurality of compressed representations associated with the plurality of symbols. For example, the data encoding system can access compressed representations of the symbols and stream them in order to create a serialized encoded bitstream. An encoder unit is one example of a means for generating a compressed bitstream by sequentially ordering a plurality of compressed representations associated with the plurality of symbols.

With reference to the figures, example embodiments of the present disclosure will be discussed in further detail.

FIG. 1 depicts a block diagram of an example system 100 for controlling the navigation of a vehicle according to example embodiments of the present disclosure. As illustrated, FIG. 1 shows a system 100 that can include a vehicle 102; an operations computing system 104; one or more remote computing devices 106; a communication network 108; a vehicle computing system 112; one or more autonomy system sensors 114; autonomy system sensor data 116; a positioning system 118; an autonomy computing system 120; map data 122; a perception system 124; a prediction system 126; a motion planning system 128; state data 130; prediction data 132; motion plan data 134; a communication system 136; a vehicle control system 138; and a human-machine interface 140.

The operations computing system 104 can be associated with a service provider (e.g., service entity) that can provide one or more vehicle services to a plurality of users via a fleet of vehicles (e.g., service entity vehicles, third-party vehicles, etc.) that includes, for example, the vehicle 102. The vehicle services can include transportation services (e.g., rideshare services), courier services, delivery services, and/or other types of services.

The operations computing system 104 can include multiple components for performing various operations and functions. For example, the operations computing system 104 can include and/or otherwise be associated with the one or more computing devices that are remote from the vehicle 102. The one or more computing devices of the operations computing system 104 can include one or more processors and one or more memory devices. The one or more memory devices of the operations computing system 104 can store instructions that when executed by the one or more processors cause the one or more processors to perform operations and functions associated with operation of one or more vehicles (e.g., a fleet of vehicles), with the provision of vehicle services, and/or other operations as discussed herein.

For example, the operations computing system 104 can be configured to monitor and communicate with the vehicle 102 and/or its users to coordinate a vehicle service provided by the vehicle 102. To do so, the operations computing system 104 can manage a database that stores data including vehicle status data associated with the status of vehicles including vehicle 102. The vehicle status data can include a state of a vehicle, a location of a vehicle (e.g., a latitude and longitude of a vehicle), the availability of a vehicle (e.g., whether a vehicle is available to pick-up or drop-off passengers and/or cargo, etc.), and/or the state of objects internal and/or external to a vehicle (e.g., the physical dimensions and/or appearance of objects internal/external to the vehicle).

The operations computing system 104 can communicate with the one or more remote computing devices 106 and/or the vehicle 102 via one or more communications networks including the communications network 108. The communications network 108 can exchange (send or receive) signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 108 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 102.

Each of the one or more remote computing devices 106 can include one or more processors and one or more memory devices. The one or more memory devices can be used to store instructions that when executed by the one or more processors of the one or more remote computing devices 106 cause the one or more processors to perform operations and/or functions including operations and/or functions associated with the vehicle 102 including exchanging (e.g., sending and/or receiving) data or signals with the vehicle 102, monitoring the state of the vehicle 102, and/or controlling the vehicle 102. The one or more remote computing devices 106 can communicate (e.g., exchange data and/or signals) with one or more devices including the operations computing system 104 and the vehicle 102 via the communications network 108.

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to determine and/or modify one or more states of the vehicle 102 including a location (e.g., latitude and longitude), a velocity, acceleration, a trajectory, and/or a path of the vehicle 102 based in part on signals or data exchanged with the vehicle 102. In some implementations, the operations computing system 104 can include the one or more remote computing devices 106.

The vehicle 102 can be a ground-based vehicle (e.g., an automobile, bike, scooter, other light electric vehicle, etc.), an aircraft, and/or another type of vehicle. The vehicle 102 can be an autonomous vehicle that can perform various actions including driving, navigating, and/or operating, with minimal and/or no interaction from a human driver. The autonomous vehicle 102 can be configured to operate in one or more modes including, for example, a fully autonomous operational mode, a semi-autonomous operational mode, a park mode, and/or a sleep mode. A fully autonomous (e.g., self-driving) operational mode can be one in which the vehicle 102 can provide driving and navigational operation with minimal and/or no interaction from a human driver present in the vehicle. A semi-autonomous operational mode can be one in which the vehicle 102 can operate with some interaction from a human driver present in the vehicle. Park and/or sleep modes can be used between operational modes while the vehicle 102 performs various actions including waiting to provide a subsequent vehicle service, and/or recharging between operational modes.

An indication, record, and/or other data indicative of the state of the vehicle, the state of one or more passengers of the vehicle, and/or the state of an environment including one or more objects (e.g., the physical dimensions and/or appearance of the one or more objects) can be stored locally in one or more memory devices of the vehicle 102. Additionally, the vehicle 102 can provide data indicative of the state of the vehicle, the state of one or more passengers of the vehicle, and/or the state of an environment to the operations computing system 104, which can store an indication, record, and/or other data indicative of the state of the one or more objects within a predefined distance of the vehicle 102 in one or more memory devices associated with the operations computing system 104 (e.g., remote from the vehicle). Furthermore, the vehicle 102 can provide data indicative of the state of the one or more objects (e.g., physical dimensions and/or appearance of the one or more objects) within a predefined distance of the vehicle 102 to the operations computing system 104, which can store an indication, record, and/or other data indicative of the state of the one or more objects within a predefined distance of the vehicle 102 in one or more memory devices associated with the operations computing system 104 (e.g., remote from the vehicle).

The vehicle 102 can include and/or be associated with the vehicle computing system 112. The vehicle computing system 112 can include one or more computing devices located onboard the vehicle 102. For example, the one or more computing devices of the vehicle computing system 112 can be located on and/or within the vehicle 102. The one or more computing devices of the vehicle computing system 112 can include various components for performing various operations and functions. For instance, the one or more computing devices of the vehicle computing system 112 can include one or more processors and one or more tangible, non-transitory, computer readable media (e.g., memory devices). The one or more tangible, non-transitory, computer readable media can store instructions that when executed by the one or more processors cause the vehicle 102 (e.g., its computing system, one or more processors, and other devices in the vehicle 102) to perform operations and functions, including those described herein.

As depicted in FIG. 1, the vehicle computing system 112 can include one or more autonomy system sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more autonomy system sensors 114 can be configured to generate and/or store data including the autonomy system sensor data 116 associated with one or more objects that are proximate to the vehicle 102 (e.g., within range or a field of view of one or more of the one or more sensors 114). The one or more autonomy system sensors 114 can include a Light Detection and Ranging (LIDAR) system, a Radio Detection and Ranging (RADAR) system, one or more cameras (e.g., visible spectrum cameras and/or infrared cameras), motion sensors, and/or other types of imaging capture devices and/or sensors. The autonomy system sensor data 116 can include image data, radar data, LIDAR data, and/or other data acquired by the one or more autonomy system sensors 114. The one or more objects can include, for example, pedestrians, vehicles, bicycles, and/or other objects. The one or more sensors can be located on various parts of the vehicle 102 including a front side, rear side, left side, right side, top, or bottom of the vehicle 102. The autonomy system sensor data 116 can be indicative of locations associated with the one or more objects within the surrounding environment of the vehicle 102 at one or more times. For example, autonomy system sensor data 116 can be indicative of one or more LIDAR point clouds associated with the one or more objects within the surrounding environment. The one or more autonomy system sensors 114 can provide the autonomy system sensor data 116 to the autonomy computing system 120. In some examples, the LIDAR point clouds can be provided to a data encoding system as described herein to encode and compress the data.

In addition to the autonomy system sensor data 116, the autonomy computing system 120 can retrieve or otherwise obtain data including the map data 122. The map data 122 can provide detailed information about the surrounding environment of the vehicle 102. For example, the map data 122 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the vehicle 102. The positioning system 118 can be any device or circuitry for analyzing the position of the vehicle 102. For example, the positioning system 118 can determine position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 102 can be used by various systems of the vehicle computing system 112 and/or provided to one or more remote computing devices (e.g., the operations computing system 104 and/or the remote computing device 106). For example, the map data 122 can provide the vehicle 102 relative positions of the surrounding environment of the vehicle 102. The vehicle 102 can identify its position within the surrounding environment (e.g., across six axes) based at least in part on the data described herein. For example, the vehicle 102 can process the autonomy system sensor data 116 (e.g., LIDAR data, camera data) to match it to a map of the surrounding environment to get an understanding of the vehicle's position within that environment (e.g., transpose the vehicle's position within its surrounding environment).

The autonomy computing system 120 can include a perception system 124, a prediction system 126, a motion planning system 128, and/or other systems that cooperate to perceive the surrounding environment of the vehicle 102 and determine a motion plan for controlling the motion of the vehicle 102 accordingly. For example, the autonomy computing system 120 can receive the autonomy system sensor data 116 from the one or more autonomy system sensors 114, attempt to determine the state of the surrounding environment by performing various processing techniques on the autonomy system sensor data 116 (and/or other data), and generate an appropriate motion plan through the surrounding environment. The autonomy computing system 120 can control the one or more vehicle control systems 138 to operate the vehicle 102 according to the motion plan. One or more of these systems/computing functions can be included within the same system and/or share one or more computing resources.

The perception system 124 can identify one or more objects that are proximate to the vehicle 102 based on autonomy system sensor data 116 received from the autonomy system sensors 114. In particular, in some implementations, the perception system 124 can determine, for each object, state data 130 that describes the current state of such object. As examples, the state data 130 for each object can describe an estimate of the object's: current location (also referred to as position); current speed; current heading (which may also be referred to together as velocity); current acceleration; current orientation; size/footprint (e.g., as represented by a bounding shape such as a bounding polygon or polyhedron); class of characterization (e.g., vehicle class versus pedestrian class versus bicycle class versus other class); yaw rate; and/or other state information. In some implementations, the perception system 124 can determine state data 130 for each object over a number of iterations. In particular, the perception system 124 can update the state data 130 for each object at each iteration. Thus, the perception system 124 can detect and track objects (e.g., vehicles, bicycles, pedestrians, etc.) that are proximate to the vehicle 102 over time, and thereby produce a presentation of the world around a vehicle 102 along with its state (e.g., a presentation of the objects of interest within a scene at the current time along with the states of the objects).

The prediction system 126 can receive the state data 130 from the perception system 124 and predict one or more future locations and/or moving paths for each object based on such state data. For example, the prediction system 126 can generate prediction data 132 associated with each of the respective one or more objects proximate to vehicle 102. The prediction data 132 can be indicative of one or more predicted future locations of each respective object. The prediction data 132 can be indicative of a predicted path (e.g., predicted trajectory) of at least one object within the surrounding environment of the vehicle 102. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128.

The motion planning system 128 can determine a motion plan and generate motion plan data 134 for the vehicle 102 based at least in part on the prediction data 132 (and/or other data). The motion plan data 134 can include vehicle actions with respect to the objects proximate to the vehicle 102 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 102 can perform a certain action (e.g., pass an object) without increasing the potential risk to the vehicle 102 and/or violating any traffic laws (e.g., speed limits, lane boundaries, signage). The motion plan data 134 can include a planned trajectory, velocity, acceleration, and/or other actions of the vehicle 102.

As one example, in some implementations, the motion planning system 128 can determine a cost function for each of one or more candidate motion plans for the autonomous vehicle 102 based at least in part on the current locations and/or predicted future locations and/or moving paths of the objects. For example, the cost function can describe a cost (e.g., over time) of adhering to a particular candidate motion plan. For example, the cost described by a cost function can increase when the autonomous vehicle 102 approaches impact with another object and/or deviates from a preferred pathway (e.g., a predetermined travel route).

Thus, given information about the current locations and/or predicted future locations and/or moving paths of objects, the motion planning system 128 can determine a cost of adhering to a particular candidate pathway. The motion planning system 128 can select or determine a motion plan for the autonomous vehicle 102 based at least in part on the cost function(s). For example, the motion plan that minimizes the cost function can be selected or otherwise determined. The motion planning system 128 then can provide the selected motion plan to a vehicle controller that controls one or more vehicle controls (e.g., actuators or other devices that control gas flow, steering, braking, etc.) to execute the selected motion plan.

The motion planning system 128 can provide the motion plan data 134 with data indicative of the vehicle actions, a planned trajectory, and/or other operating parameters to the vehicle control systems 138 to implement the motion plan data 134 for the vehicle 102. For instance, the vehicle 102 can include a mobility controller configured to translate the motion plan data 134 into instructions. By way of example, the mobility controller can translate a determined motion plan data 134 into instructions for controlling the vehicle 102 including adjusting the steering of the vehicle 102 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and it's one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections, etc.). In some implementations, the communications system 136 can allow communication among one or more of the systems on-board the vehicle 102. The communications system 136 can also be configured to enable the autonomous vehicle to communicate with and/or provide and/or receive data and/or signals from a remote computing device 106 associated with a user and/or an item (e.g., an item to be picked-up for a courier service). The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop, and/or smartphone) can be viewable by a user of the vehicle 102 that is located in the front of the vehicle 102 (e.g., driver's seat, front passenger seat). Additionally, or alternatively, a display device can be viewable by a user of the vehicle 102 that is located in the rear of the vehicle 102 (e.g., a passenger seat in the back of the vehicle).

Figure 2:
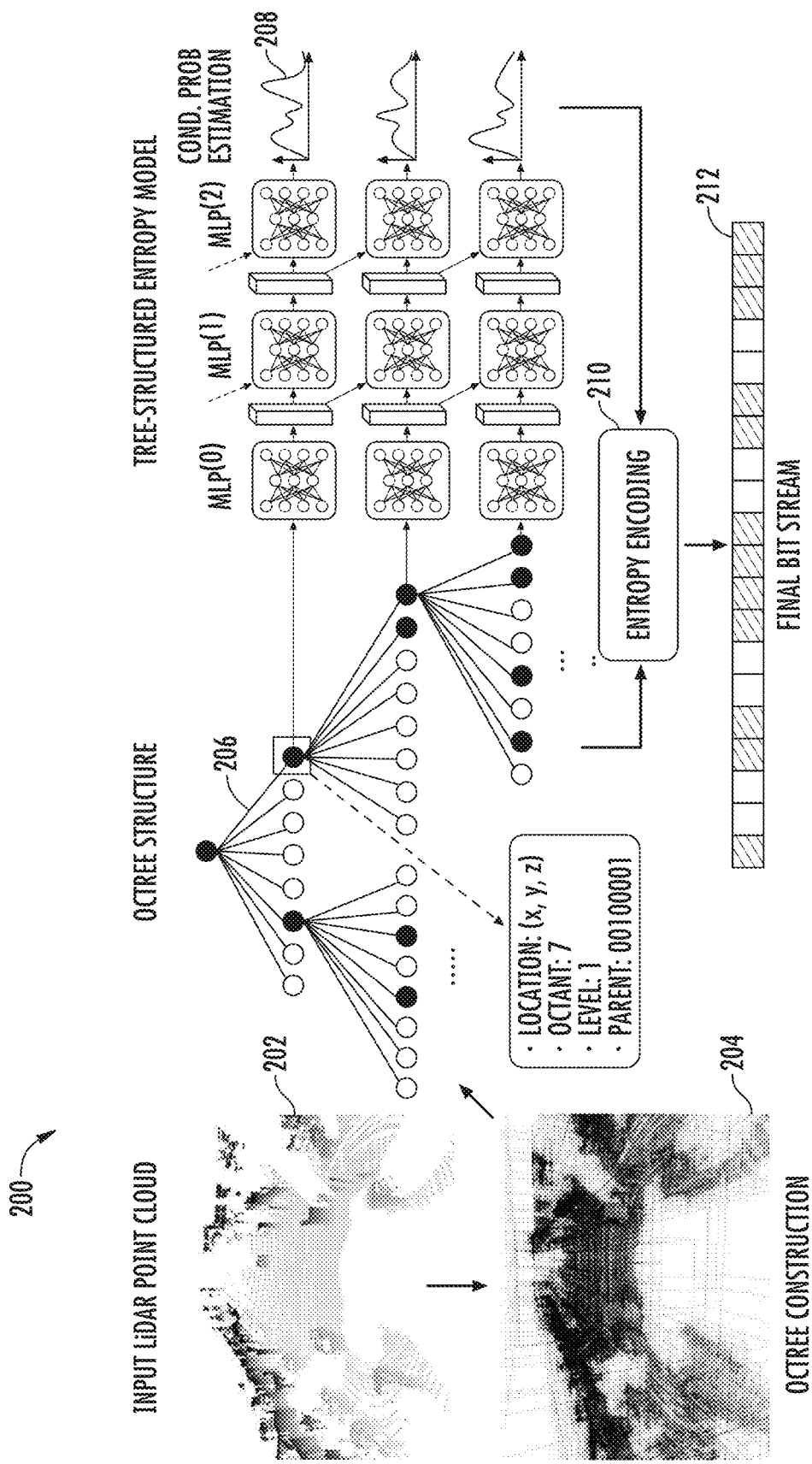
FIG. 2 depicts a flow diagram of a method for generating entropy encoded representations of point cloud data according to example embodiments of the present disclosure.

FIG. 2 depicts a flow diagram 200 of a method for generating entropy encoded representations of point cloud data according to example embodiments of the present disclosure. As shown in FIG. 2, a data encoding system can receive LIDAR point cloud data 202 from a LIDAR sensor. The LIDAR point cloud data 202 can include a series of points in a three-dimensional space around a sensor. The points can be generated by the lidar sensor by transmitting laser light from the sensor and determining the distance from the sensor at which the laser light pulse was reflected based on the delay between when the beam wave was transmitted and when it was received, among other factors.

The data encoding system can convert the point cloud data 202 into a tree-based data structure for easier processing. For example, the tree-based data structure can be an octree data structure 206. The octree data structure 206 can be generated by subdividing a three-dimensional space into eight different sub-areas 204. The data encoding system can determine, for each sub-area, whether the sub-area is occupied by at least one point in the point cloud data.

Each sub-area that is occupied can then be divided further to create eight additional sub-areas within the original sub-area. This subdividing process can continue until a minimum sub-area size is reached. In some examples, the minimum subarea size may be predetermined based on the constraints of the system. Alternatively, the minimum sub-area size can be determined based on the analysis of the data. For example, if no sub-areas exist that include more than one point from the point cloud data, the data encoding system can determine that no further subdivision is necessary.

The octree data structure 206 can include a series of nodes, organized in a hierarchical manner, each node represented by a series of 8-bit values. Each node in the octree structure can represent a particular sub-area and have up to eight child nodes. The 8-bit value associated with a particular node can represent the occupancy of each of the eight sub-areas associated with the particular node. For example, if no points from the point cloud data are included in a particular sub-area, the corresponding bit in the 8-bit value can be set to zero. That sub-area may no longer be subdivided because no additional information can be derived from an empty sub-area.

Once the tree-based structure 206 has been generated, the data encoding system can serialize the data within the tree-based structure 206. To generate a serialized representation of the tree-based structure 206, a serialization system can traverse the tree-based structure and generate a symbol representing each node for use in a serialized data structure.

In some examples, the data encoding system can generate contextual information for each node in the tree-based structure. Once the contextual information has been calculated by the data encoding system, the contextual information can be used as input to an entropy encoder included in the data encoding system.

The resulting output can be an estimated distribution 208 for each node (and its associated symbol in the linear representation). The estimated distribution 208 can be used by the entropy encoding system 210 to generate an encoded bitstream representation 212 of the original point cloud data 202.

Figure 3:
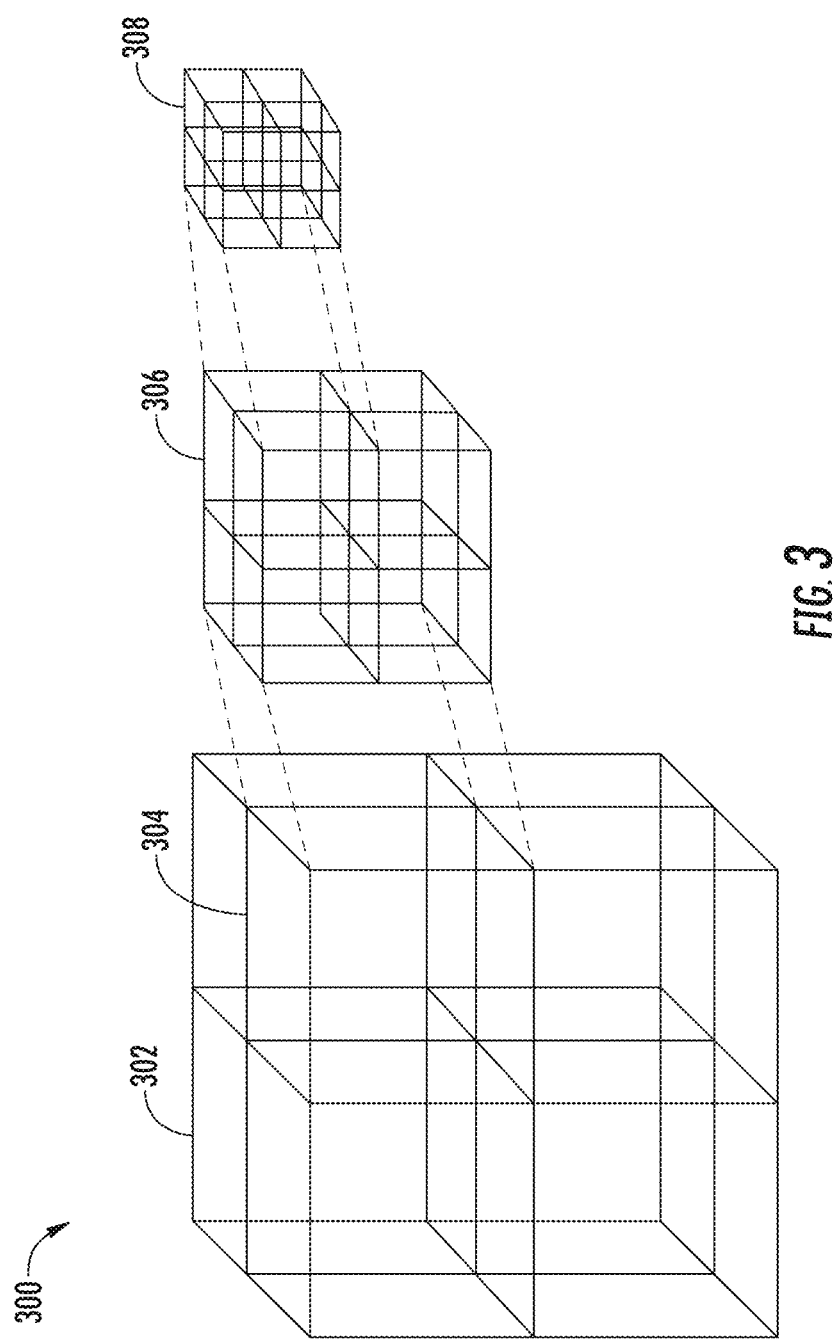
FIG. 3 depicts an example area sub-divided into a plurality of sub-areas according to example embodiments of the present disclosure.

FIG. 3 depicts an example area 300 sub-divided into a plurality of sub-areas according to example embodiments of the present disclosure. As shown in this example, a given three-dimensional space 302 can be subdivided into eight sub-areas (octants). The data encoding system can determine, based on received point cloud data, the current occupancy of each octant. While no point cloud data is displayed in this example, in actual implementations, the data encoding system can determine where each point in the point cloud data is located in the three-dimensional space.

If a particular sub-area 304 is determined to include at least one point in the point cloud data, the data encoding system can further sub-divide the particular sub-area 304 into eight sub-areas. Again, if a particular sub-area 306 is determined to include one or more points from the point cloud data, the data encoding system can subdivide the particular sub-area into eight additional sub-areas. One or more of the eight additional sub-areas can include one or more points from the point cloud. Thus, the subdivision can be repeated again, for example, with sub-area 308 until the data encoding system determines that no further subdivision is necessary. If a particular sub-area is not determined to include any points from the point cloud data, the data encoding system can withhold from subdividing that particular area. In this way, the sparse data from a point cloud in a three-dimensional space can be divided to efficiently represent point cloud data.

Figure 4:
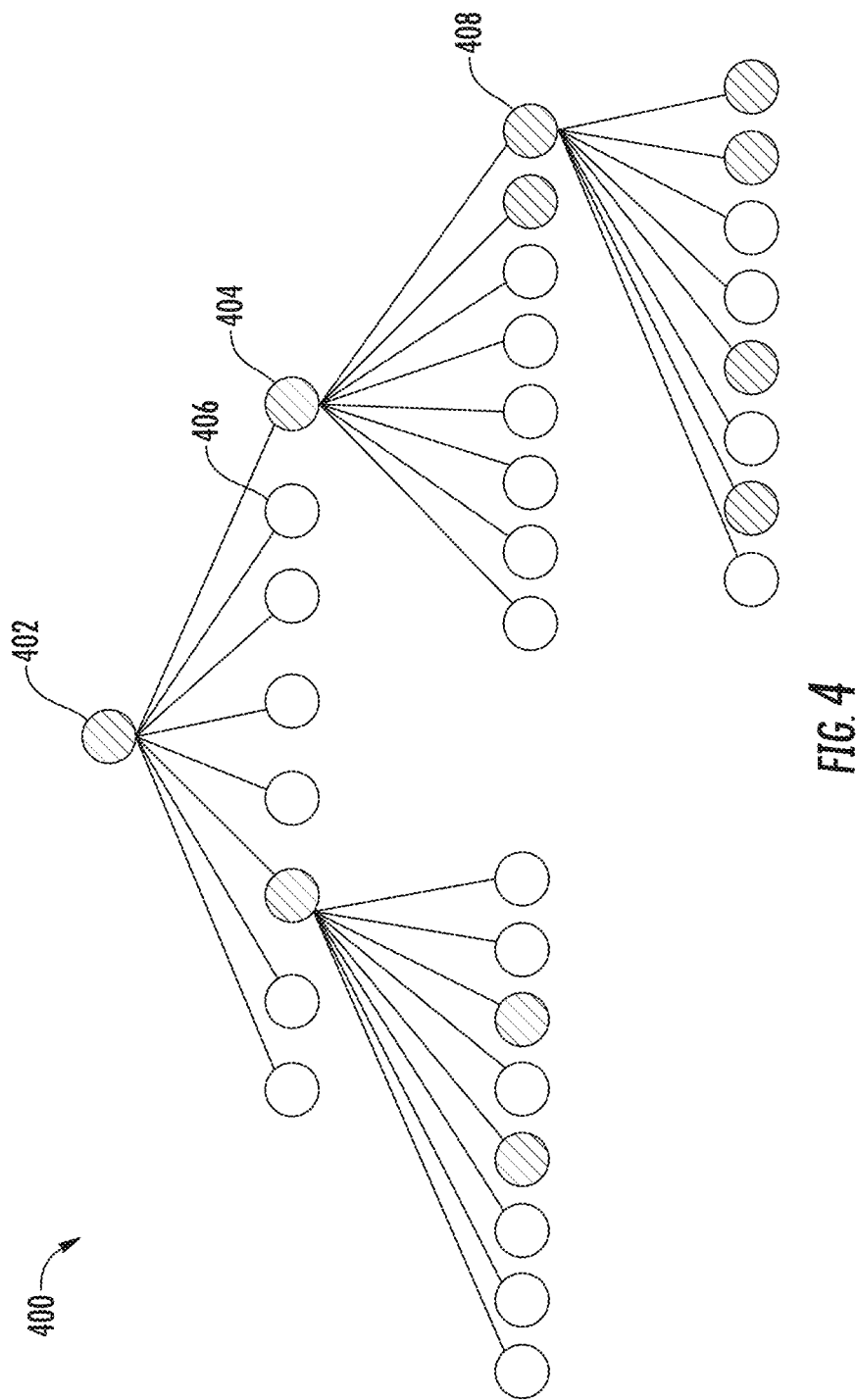
FIG. 4 depicts an example octree according to example embodiments of the present disclosure.

FIG. 4 depicts an example octree 400 according to example embodiments of the present disclosure. In this example, the octree 400 can be a hierarchical tree structure with a series of nodes, with an initial node representing the entire three-dimensional space. The initial node 402 can have up to eight child nodes. The initial node 402 can be associated with a three-dimensional space, the three-dimensional space can be divided into eight sub-areas. A child node 404 can be generated for any of the eight sub-areas that include at least one point in the point cloud data.

In addition, each node can have associated occupancy information. This information can be represented as an eight-bit value associated with the node. The eight-bit value can represent the occupancy of each of the eight sub-areas associated with that node. For example, a "1" can represent that the associated sub-area is occupied and a "0" can indicate that the associated sub-area is not occupied.

If a child node 406 is determined to be not occupied, the area associated with that child node 406 is not further subdivided. Furthermore, a child node 404 that is subdivided, can also have one or more child nodes that are occupied 408. Those occupied nodes can then be subdivided into sub-areas.

Figure 5:
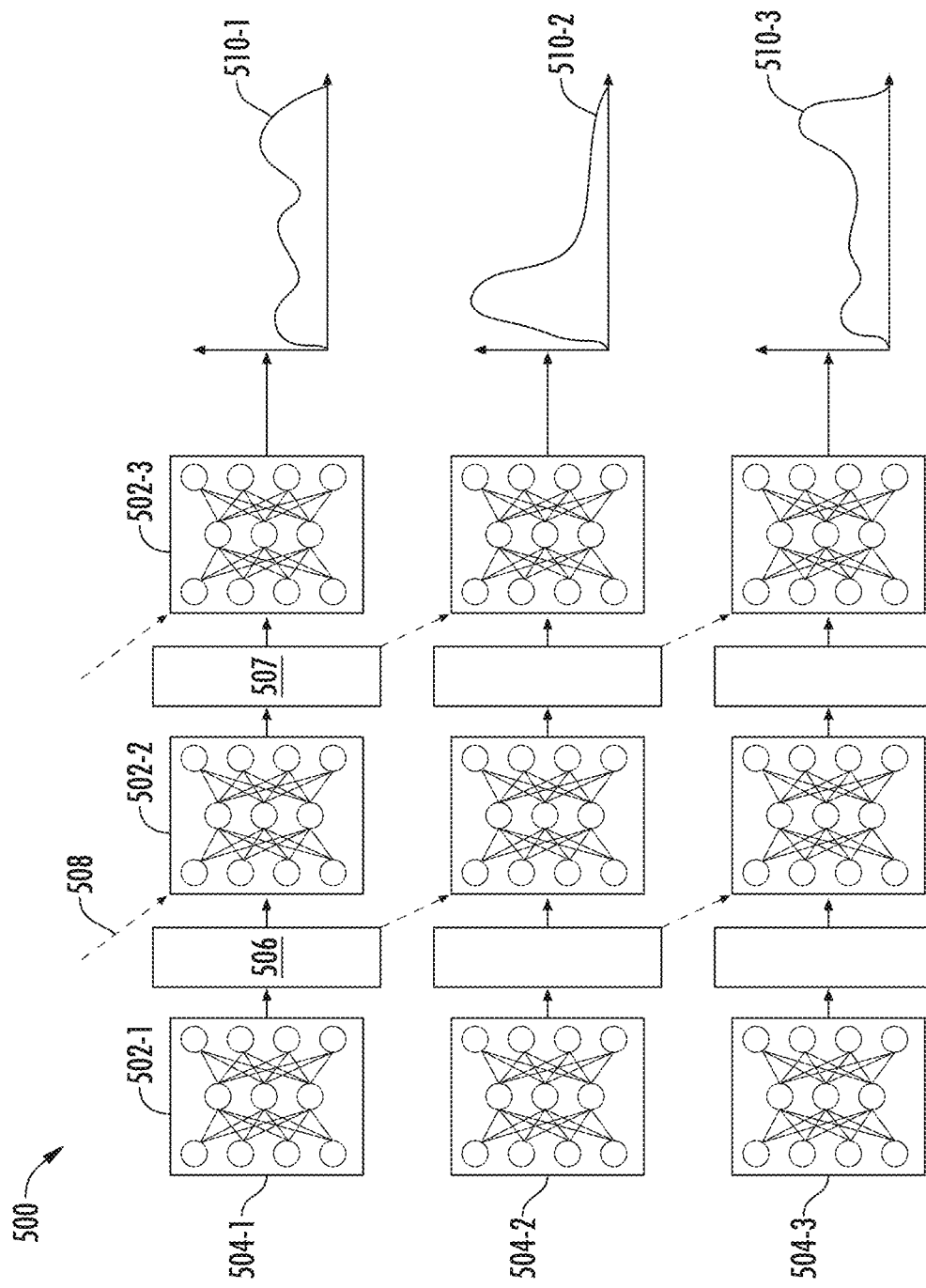
FIG. 5 depicts an example of a multi-layer perceptron according to example embodiments of the present disclosure.

FIG. 5 depicts an example of a multi-layer perceptron (MLP) 500 according to example embodiments of the present disclosure. The multi-layer perceptron 500 can process one node at a time. As input, the MLP 500 can use a symbol representing the node and contextual information for the node. The symbol can be the eight-bit value (as noted above) that can be associated with a respective node and represents the occupancy of the child nodes of the respective node.

In some examples, an encoding system can generate contextual information for each node in the tree-based structure. Contextual information is information that can be generated for a particular node without the content of the node itself. Contextual information can include a level in the tree-based data structure associated with the node. For example, the initial node can have a level value of 1 (or 0). The child nodes of the initial node can have a level value of 2 (or 1), and so on. Contextual information can further include the parent occupancy values for the current node. This information can be represented as an eight-bit value associated with the parent node. The eight-bit value can represent the occupancy of each of the eight sub-areas associated with that parent node. For example, a "1" can represent that the associated sub-area is occupied and a "0" can indicate that the associated sub-area is not occupied.

The contextual information can also include an octant index for the respective node. The octant index can include a value between 0 and 7, wherein the value represents the respective node's position within the eight child nodes associated with the parent node. Thus, the first child node can have an octant index of zero and the last child node can have an octant index of seven. The octant index values can represent the same sub-areas of each node regardless of which node is in question. Thus, the first child node (e.g., octant index 0) can be the front top right sub-area of the parent node. Any method for associated octant index values with particular sub-areas within the parent can be used so long as it is kept consistent throughout all nodes.

The contextual information can include identifying the particular space associated with the respective note. For example, the contextual information can include information indicating which area of the three-dimensional space is represented by the node. In some examples, this information can be determined based on the position of the parent node and the octant index value for the respective number.

Once the contextual information has been calculated by the encoding system, that information can be used as input to an entropy model. In some examples, the entropy model can be referred to as a tree-based structured deep entropy model. In some examples, the entropy model can include multiple multi-layered perceptrons (MLPs). For example, the entropy model can be a stacked-entropy model with multiple MLPs that receive the output of a previous MLP and generate output that may be used as input to a subsequent MLP.

Specifically, the entropy model can include multiple MLP layers (e.g., 502-1, 502-2, and 502-3 are three MLP layers). The first MLP can be a 5-layer MLP with 128-dimensional hidden features. All subsequent MLPs can be 3-layer MLPs (with residual layers) with 128-dimensional hidden features. A final linear layer followed by a soft-max is used to make a 256-way prediction. The 256-way prediction can represent the likelihood, for a respective node of each potential eight-bit value, that the symbol associated with the respective node has that potential eight-bit value.

For example eight-bit symbols (e.g., representing a node) in a plurality of eight-bit symbols, the goal of an entropy model can be to generate an estimate distribution $q(x_n)$ for a particular symbol $x_n$ that minimizes the difference (or cross-extropy) with the actual distribution of symbols for the particular symbol $p(x_n)$ as represented by the below equation.

$$H(p,q)=E_{x \sim p}[-\log_2 q(x)]$$

According to Shannon's source coding theorem, the cross-entropy between $q(x)$ and $p(x)$ provides a tight lower bound on the bitrate achievable by arithmetic or range coding algorithms such that the better $q(x)$ approximates $p(x)$, the lower the true bitrate. The entropy model can be trained to minimize the cross-entropy loss between the models predicted distribution q and the distribution of training data.

The system can factor $q(x)$ into a product of conditional probabilities of each individual occupancy symbol $x_i$ as follows:

$$q(x) = \prod_i q_i(x_i | x_{an(i)}, c_i; w)$$

where $x_{an(i)} = \{x_{pa(i)}, x_{pa(pa(i))}, \ldots, x_{pa(\ldots(pa(i)))}\}$ with $|x_{an(i)}| \leq K$ can be the set of ancestor nodes of a given node i, up to a given order K. Here, $c_i$ is the contextual information that is available as prior knowledge during encoding/decoding of $x_i$, such as octant index, the spatial location of the octant, level in the octree, parent occupancy, etc. These models take advantage of the tree structure to gather both the information from nodes at coarser levels (e.g., receiving information at 508 from a parent node) and the contextual information available at the current node. Conditioning on ancestor nodes can help to reduce the entropy for the current node prediction, since it is easier to predict the finer geometry structure at the current node when the coarse structure represented by ancestor nodes is already known. Contextual information such as location information can help to reduce entropy even further by capturing the prior structure of the scene. For instance, in the setting of using LiDAR data in the self-driving scenario, an occupancy node 0.5 meters above the LiDAR sensor is unlikely to be occupied.

The entropy model can model the estimated distribution ($q_i (x_i | x_{an(i)}; c_i; w)$) by first extracting an independent contextual embedding for each node i ($x_i$) and then performing progressive aggregation of contextual embeddings (e.g., 506 and 507) to incorporate ancestral information $x_{an(i)}$ for a given node.

For a given intermediate octree node $x_i$, the input contextual information (also referred to as a context feature) $c_i$ can include the octree level, parent byte, octant index, and spatial location of the node's octant. The entropy model can extract an independent deep feature for each node through a multilayer perceptron (MLP) with the context feature $c_i$ as input:

$$h_i^{(0)} = MLP^{(0)}(c_i)$$

Starting with the feature $h_i^{(0)}$ for each node, the system can perform K aggregations between the current node feature and the feature of its parent. At iteration k, the aggregation can also be modeled as an MLP:

$$h_i^{(k)} = MLP^{(k)}([h_i^{k-1}], [h_{pa(i)}^{k-1}])$$

where $h_{pa(i)}^{(k-1)}$ is the hidden feature of node i's parent node. For the root node, the system can consider the root's parent feature as all zero features. This can be beneficial as it can provide model consistency. The final output of the entropy model can be a linear layer on top of the K-th aggregated feature $h_i^{(k)}$ producing a 256-dimensional softmax of probabilities for the 8-bit occupancy symbol of the given node:

$$q_i(\bullet | = x_{an(i)}, c_i; w) = g(h_i^k)$$

These aggregations can aggregate the node feature of a respective node with that of its parent node. In some implementations, the aggregations do not aggregate the node feature of a respective node with that of its child node. For instance, the child input contextual information may not be available during sequential decoding. Moreover, each additional aggregation can increase the receptive field of ancestral features by 1, and so the k-th aggregation has a receptive field of k ancestors. As depicted by FIG. 5, in some examples, the entropy model can be a stacked entropy model with K=3 (e.g., 504-1, 504-2, and 504-3). Using this example configuration, a model with K levels of aggregations can predict the probability of the current node ($x_i$) by considering the node feature itself as well as K−1 generations of the ancestor's feature.

Thus, this entropy model can be an autoregressive model that is applied along the tree traversal path from the root to each node. The resulting output is an estimated distribution for each node (510-1, 510-2, and 510-3). The estimated distribution can be used by the data encoding system to generate an encoded bitstream representation of the original point cloud data.

Figure 6:
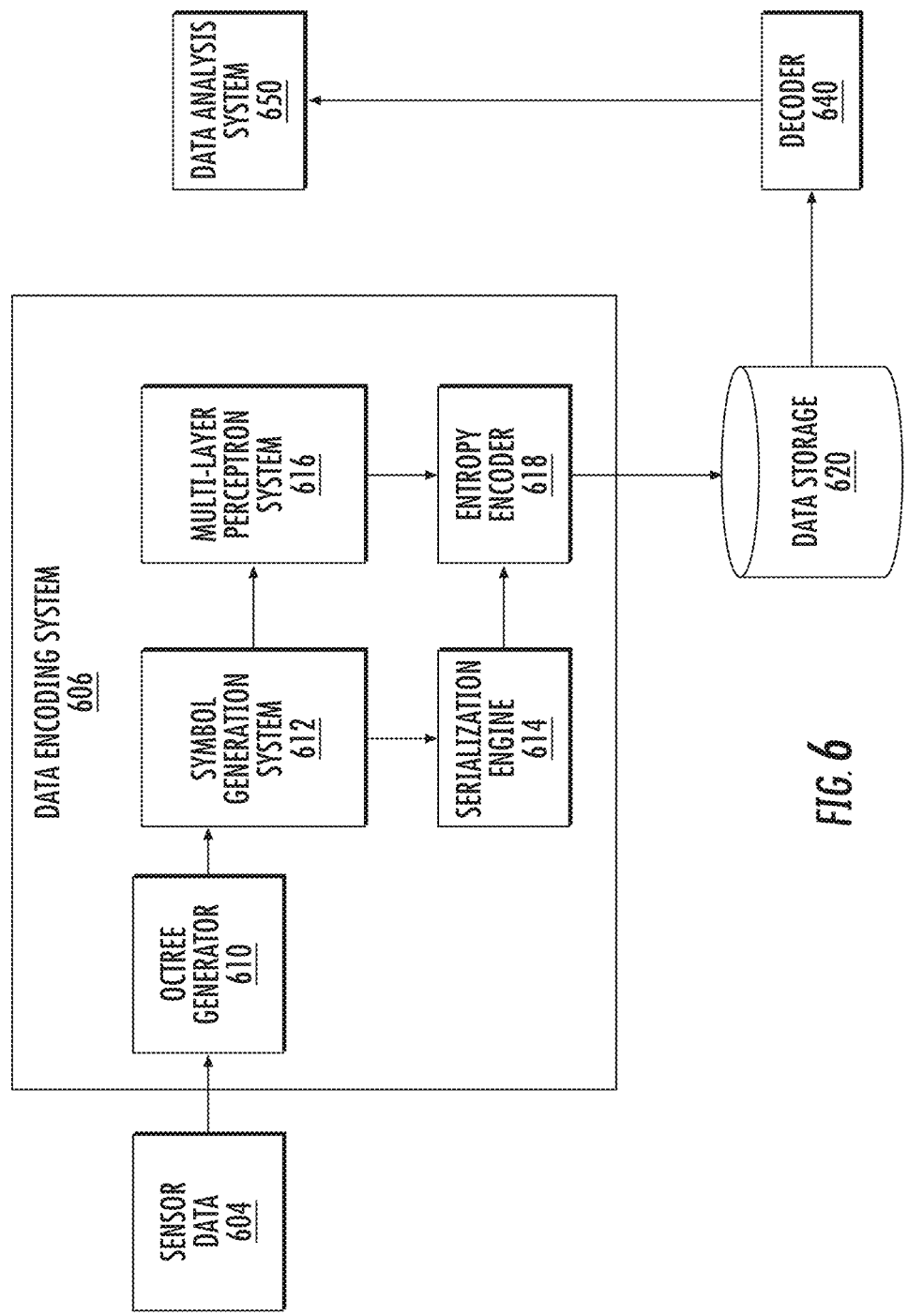
FIG. 6 depicts a block diagram of an example system for generating entropy encoded representations of point cloud data according to example embodiments of the present disclosure.

FIG. 6 depicts a block diagram of an example system for generating entropy encoded representations of point cloud data according to example embodiments of the present disclosure. The data encoding system 606 can receive the sensor data 604 (e.g., point cloud data) from a LIDAR sensor. In some examples, the data encoding system 606 can include a plurality of components. For example, the data encoding system 606 can include an octree generator 610, a symbol generation system 612, a serialization engine 614, a multi-layer perceptron system 616, and an entropy encoder 618. The data encoding system 606 can output encoded data to a data storage database 620. The stored encoded data can be accessed by a decoder 640 and transferred to a data analysis system 650.

Once the sensor data 604 has been received, the octree generator 610 can process the data to generate a tree-based data structure for representing and/or storing the point cloud data. In some examples, the tree-based data structure may be an octree wherein each node can have up to eight child nodes with which it is associated. It should be noted that leaf nodes (e.g., the bottom nodes in the tree-based structure) do not have any associated child nodes (which is what makes them leaf nodes).

In some examples, the octree generator 610 can generate a tree-based data structure by subdividing the entire three-dimensional space into eight equal sub-areas (octants). Thus, an initial node of the tree-based data structure can represent the entire space represented by the point cloud data, and each of the eight sub-areas can be represented by a child node of the initial node (e.g., a level below the initial node and associated with the initial node in the hieratical structure). In some examples, the initial node can have an associated eight-bit value with each bit representing the occupancy of each of the eight sub-areas. A sub-area can be determined to be occupied if at least one point in the point cloud data is within the sub-area.

The symbol generation system 612 can generate, for each node, a symbol. In some examples, the symbol for a given node is an eight-bit value that represents the occupancy of the child nodes of the respective node.

Once the tree-based structure and accompanying symbol data has been generated, the serialization engine 614 can serialize the data within the tree-based structure. To generate a serialized representation of the tree-based structure, the serialization engine 614 can traverse the tree-based structure and enter the symbol representing each node into a serialized data structure.

In some examples, the nodes can be traversed in a breadth-first manner. A breadth-first traversal of an octree can include accessing each node on a particular level of the tree-based structure and adding a symbol representing them to the serial data structure before accessing any nodes from a lower level. In other examples, a depth-first traversal method or other traversal method can be used.

In some examples, the symbol generation system 612 can generate contextual information for each node in the tree-based structure. Contextual information can be information that can be generated for a particular node without the content of the node itself. Contextual information can include a level in the tree-based data structure associated with the node. For example, the initial node can have a level value of 1 (or 0). The child nodes of the initial node can have a level value of 2 (or 1), and so on. Contextual information can further include the parent occupancy values for the current node. This information can be represented as an eight-bit value associated with the parent node. The eight-bit value can represent the occupancy of each of the eight sub-areas associated with that parent node. For example, a "1" can represent that the associated sub-area is occupied and a "0" can indicate that the associated sub-area is not occupied.

The contextual information can also include an octant index for the respective node. The octant index can include a value between 0 and 7, wherein the value represents the respective node's position within the eight child nodes associated with the parent node. Thus, the first child node can have an octant index of zero and the last child node can have an octant index of seven. The octant index values can represent the same sub-areas of each node regardless of which node is in question. Thus, the first child node (e.g., octant index 0) can be the front top right sub-area of the parent node. Any method for associated octant index values with particular sub-areas within the parent can be used so long as it is kept consistent throughout all nodes.

The contextual information can include identifying the particular space associated with the respective node. For example, the contextual information can include information indicating which area of the three-dimensional space is represented by the node. In some examples, this information can be determined based on the position of the parent node and the octant index value for the respective number.

Once the contextual information has been generated by the symbol generation system 612, that information can be used as input to an entropy model. In some examples, the entropy model can be referred to as a tree-based structured deep entropy model. In some examples, the entropy model can include multiple multi-layered perceptrons (MLPs) in a multi-layer perceptron system 616. For example, the multi-layer perceptron system 616 can include a stacked-entropy model with multiple MLPs that receive the output of a previous MLP and generate output that may be used as input to a subsequent MLP.

Specifically, the multi-layer perceptron system 616 can include multiple MLP layers. The first MLP can be a 5-layer MLP with 128 dimensional hidden features. All subsequent MLPs can be 3-layer MLPs (with residual layers) with 128 dimensional hidden features. A final linear layer followed by a soft-max is used to make a 256-way prediction. The 256-way prediction can represent the likelihood, for a respective node of each potential eight-bit value, that the symbol associated with the respective node has that potential eight-bit value.

For example, using eight-bit symbols (e.g., representing a node) in a plurality of eight-bit symbols as input, the goal of an entropy model can be to generate an estimate distribution $q(x_n)$ for a particular symbol $x_n$ that minimizes the difference (or cross-extropy) with the actual distribution of symbols for the particular symbol $p(x_n)$ as represented by the below equation.

$$H(p,q)=E_{x \sim p}[-\log_2 q(x)]$$

The entropy model can model the estimated distribution $(q_i (x_i|x_{an(i)}; c_i; w)$ by first extracting an independent contextual embedding for each node i $(x_i)$ and then performing progressive aggregation of contextual embeddings to incorporate ancestral information $x_{an(i)}$ for a given node.

For a given intermediate octree node $x_i$, the input contextual information (also referred to a context feature) $c_i$ can include the octree level, parent byte, octant index, and spatial location of the node's octant. The final output of the multi-layer perceptron system 616 can be a linear layer on top of the K-th aggregated feature $h_i^{(k)}$ producing a 256-dimensional softmax of probabilities for the 8-bit occupancy symbol of the given node.

Thus, a multi-layer perceptron system 616 can include an autoregressive model that is applied along the tree traversal path from the root to each node. The resulting output of the multi-layer perceptron system 616 can be an estimated distribution for each node (and its associated symbol in the linear representation). The estimated distribution can be used by the data encoding system to generate an encoded bitstream representation of the original point cloud data (e.g., sensor data 604).

At the encoding stage, the entropy encoder 618 can apply the encoding model sequentially across different levels of the tree-based data structure, from the initial node to the leaf nodes. Because the multi-layer perceptron system 616 does not propagate information, the entropy encoder 618 can parallelize the computation for probability estimation. The entropy encoder 618 can use the resulting estimated distribution to losslessly compress the raw sequential stream of symbols representing the nodes of the tree-based structure using an entropy coding algorithm such as arithmetic coding. By using the estimated distribution for each byte $(x_i)$ in the sequence to predict the categorical distribution (0 to 255), the entropy encoder 618 can, using an arithmetic encoding model, generate a compressed representation of the bitstream that is smaller than a compressed version that used the same estimated distribution for all symbols.

The data encoding system 606 can store an encoded data stream in a data storage system 620. To decode the stored encoded data stream, the decoder 640 can employ the same entropy model in the decoding algorithm. A tree-based data structure can then be built from the compressed bitstream and used to reconstruct the point cloud. Due to the autoregressive nature of the entropy model, each node probability estimation may only depend on itself and decoded node features at a higher level of the octree. In addition, the tree-based data structure can be serialized in a breadth-first search fashion. As a result, given a node $x_i$, its ancestors in the entropy model $x_{an(i)}$ are decoded before $x_i$, making it feasible for the decoder to quickly and efficiently decode the compressed data stream. The decoded data stream can be transferred to a data analysis system 650 for use.

In some examples, the data encoding system 606 can use additional information to improve the efficiency of encoding captured point cloud data. In some examples, the data encoding system 606 can access both occupancy data from a LIDAR point cloud and an intensity value for each point (e.g., from sensor data 604). The intensity data can be, for example, a measure, collected for every point, of the return strength of the laser pulse that generated the point. It can be based, in part, on the reflectivity of the object struck by the laser pulse.

Thus, the data encoding system 606 can quantize and encode the point cloud data into an octree representation (e.g., via octree generated 610) where leaves represent the quantized points and intermediate nodes contain 8-bit symbols representing child occupancies. Leaf nodes in the octree structure can represent specific points in the point cloud. Each point can include the intensity of the point and the offset value of the point. The offset value can represent the distance between a given point in the point cloud and the corner position.

A deep entropy model, as discussed above, can use contextual information (e.g., spatio-temporal context) to generate a statistical distribution for each node that is predictive of the occupancy of that node. In addition, the deep entropy model (e.g., multi-layer perceptron system 616) can generate predictive information of the intensity values for each point for intensity compression. Thus, the data encoding system 606 can encode both occupancy data and intensity data.

The data encoding system 606 can serialize (e.g., via the serialization engine) the octree into two different uncompressed byte streams by traversing the octree in breadth-first order. The first byte stream can contain the intermediate node occupancy symbols in breadth-first order, and the second byte stream can contain the leaf nodes with intensity values and offset values for each point in the point cloud data. The two byte streams can be represented by $P^{(t)}=(X^{(t)}, R^{(t)})$, where $X^{(t)}=\{x_1^{(t)}, \ldots, x_{mt}^{(t)}\}$ is the set of occupancy symbols, and $R^{(t)}=\{r_1^{(t)}, \ldots, r_{nt}^{(t)}\}$ is the set of intensities.

The two octree byte sequences can be used as input to an entropy encoding model 618. The entropy encoding model 618 can be a probability model that generates statistical distribution data for the points in the point cloud.

In some examples, the data encoding system 606 can make a 1st-order Markov assumption: a given octree $P^{(t)}$ only depends on the sweep preceding it, $P^{(t-1)}$. The octree can then be factored into two entropy models: the node occupancy mode $p(X^{(t)}|P^{(t-1)}; w)$, and the intensity model $p(R^{(t)}|X^{(t)}|P^{(t-1)}; w)$ conditioned on occupancies.

The dependence on past sweeps can enable the model to be applicable to an online LiDAR stream setting. The data encoding system 606 can factorize the occupancy probabilities using the following formula:

$$p(X^{(t)} | \mathcal{P}^{(t-1)}; w) = \prod_i p(x_i^{(t)} | X_{ans(i)}^{(t)}, \mathcal{P}^{(t-1)}; w)$$

In this example, $X_{ans(i)}^{(t)} = \{X_{pa(i)}^{(t)}, X_{pa(pa(i))}^{(t)}, \ldots, X_{pa(\ldots(pa(i)))}^{(t)}\}$ represents the set of ancestor nodes of $X_i^{(t)}$ and $P^{(t-1)}$ represents the point cloud from previous sweep. As seen above, the data encoding system 606 can simplify the autoregressive dependency on ancestor nodes on the octree for the given timestamp, as well as all the nodes at the previous timestamp. The data encoding system 606 can model $p(|X_{ans(i)}^{(t)}, P^{(t-1)}; w)$ with a deep neural network. The architecture has two backbones, namely the ancestral node dependence module which encodes recurrent dependencies on the ancestor nodes $X_{ans(i)}^{(t)}$ from the current sweep's octree as well as a prior octree dependence module which models information passed from the previous sweep.

In addition to generating statistical data based on the feature data associated with nodes higher in the tree hierarchy, the data encoding system can incorporate data from octrees associated with previous sweeps of the LIDAR. A sweep can represent a single 360-degree pass of the LIDAR sensor. The data encoding system 606 can incorporate the previous octree P(t−1) into the current entropy model (e.g., entropy encoder 618) at time t through a temporal octree dependence module. In some examples, the previous octree can be aligned into the sensor coordinate frame of the current octree.

Unlike the current octree where the data encoding system 606 only has access to parental information, the data encoding system 606 (or decoder 640) can access all information within the previous octree, containing both top-down ancestral information as well as bottom-up child information. The data encoding system 606 can exploit this fact via a two-stream feature backbone to compute embeddings for every octree node at time t−1. After a forward pass to generate statistical distribution data based on the features of the parent nodes, the data encoding system 606 can perform a bottom-up aggregation pass using a recurrent network that produces aggregated features from descendants to the current node. Unlike the ancestral module in which each node only has one parent, the number of children per node can vary. Thus, the data encoding system 606 can resolve this by using the following function:

$$g_{j|}^{(t-)} = f_{agg,1}(h_j^{(t-1)} + \Sigma_{c \in child(j)} f_{agg,2}(g_c^{(t-1)}))$$

which produces the final embedded feature containing both top-down and bottom-up context.

The data encoding system 606 can incorporate the set of aggregated features in the previous octree $\{g_j^{(t-1)}\}$, with ancestral features in the current octree $\{h_j^{(t)}\}$ to help with occupancy prediction in the current octree. In some examples, only a subset of spatially proximal nodes in the previous sweep can contribute to better prediction for a given node at time t. Furthermore, the relative location of each neighbor should define its relative importance. The data encoding system 606 can employ continuous convolutions to process previous octree features at the current node. A continuous conv. layer can aggregate features from neighboring points to a given node in the following manner: $h_i = \Sigma_{j \in N(i)} \sigma(p_j - p_i) h_j$ where N(i) is the i-th node's k-nearest neighboring nodes in 3D space from the (t−1) sweep, at the same level as i, and $p_i$ is the 3D position of each node.

The data encoding system 606 can apply a separate MLP with a continuous convolution layer per octree level to process the aggregated features in the previous octree $\{g_j^{(t-1)}\}$ j∈N(i) and produce an embedding feature $g_{i,st}^{(t)}$.

The data encoding system 606 can use the intensity entropy model to compress extraneous intensities tied to each spatial point coordinate. Assuming these intensities are bounded and discrete, the data encoding system 606 can factorize using the following formula:

$$p(\mathcal{R}^{(t)} | \mathcal{X}^{(t)}, \mathcal{P}^{(t-1)}; w) = \prod_i p(r_i^{(t)} | \mathcal{X}^{(t)}, \mathcal{P}^{(t-1)}; w)$$

Conditioning on the occupancies $X^{(t)}$ can emphasize that intensity decoding occurs after the point spatial coordinates have already been reconstructed in Therefore, the data encoding system can directly make use of the spatial position corresponding to each intensity $R_i^{(t)}$ in compression.

The data encoding system 606 can leverage temporal correlations between point intensities across consecutive timestamps to better model the entropy of $r_i^{(t)}$. Similar to node occupancy prediction above, the data encoding system 606 can employ continuous convolutions to incorporate previous intensity information when there are not direct correspondences between the current point cloud and the previous point cloud. For example, let $R_{N(i)}$ be the set of nearest neighbor intensities $\{r_j^{(t-1)}\}$ j∈N(i), where nearest neighbor is defined by spatial proximity of previous point j to the current point i. The data encoding system 606 can apply an MLP with a continuous conv. layer that takes the past intensities $r_j^{(t-1)}$ as input and outputs an embedding feature for each node i. This feature can be fed through a linear layer and softmax to output intensity probability values. In some examples, the intensity value is an 8-bit integer, so the resulting probability vector is 256-dimensional $p(r_i^{(t)} | X(t) | P^{(t-1)}; w))$.

The data encoding system 606 can then encode the byte streams using the entropy model discussed above to produce a compressed bitstream. The same entropy models can be used to decode the compressed bitstream and generate the original octree data.

Figure 7:
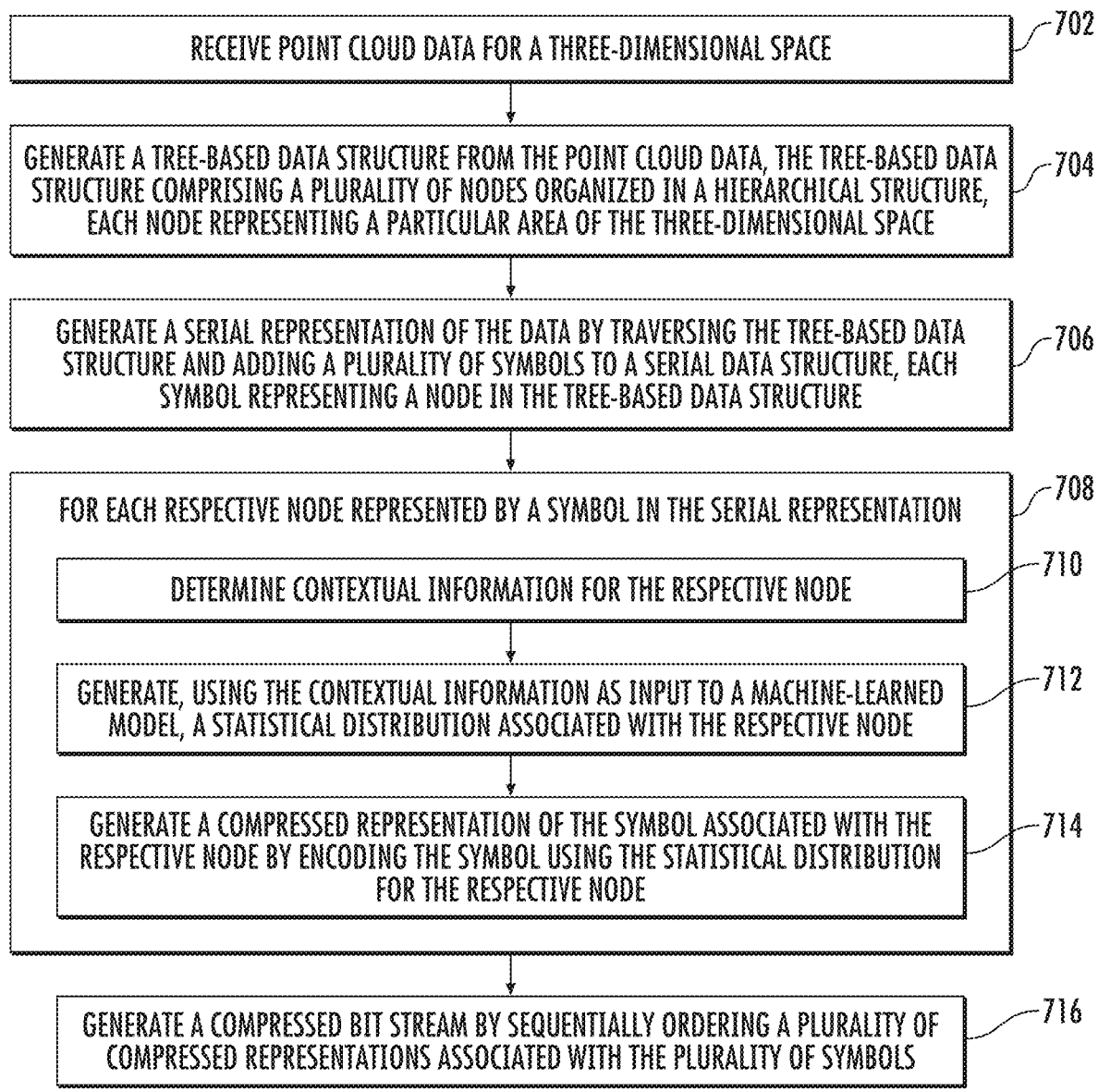
FIG. 7 depicts a flow chart diagram of an example method according to example embodiments of the present disclosure.

FIG. 7 depicts a flow chart diagram of an example method according to example embodiments of the present disclosure. One or more portion(s) of the method can be implemented by one or more computing devices such as, for example, the computing devices described herein. Moreover, one or more portion(s) of the method can be implemented as an algorithm on the hardware components of the device(s) described herein. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. The method can be implemented by one or more computing devices, such as one or more of the computing devices depicted in FIGS. 1 and 6.

An autonomous vehicle can travel through a particular three-dimensional space. As the autonomous vehicle passes through the three-dimensional space, it gathers point cloud data for the three-dimensional space using a LIDAR sensor. A data encoding system (e.g., data encoding system 606 in FIG. 6) can receive, at 702, point cloud data for the three-dimensional space. The point cloud data can be generated via a LIDAR sensor associated with an autonomous vehicle.

The data encoding system (e.g., data encoding system 606 in FIG. 6) can generate, at 704, a tree-based data structure from the point cloud data. The tree-based data structure can include a plurality of nodes organized in a hierarchical structure, each node representing a particular area of the three-dimensional space. To do so, the data encoding system (e.g., data encoding system 606 in FIG. 6) can establish an initial node representing the three-dimensional space represented by the point cloud data. The data encoding system (e.g., data encoding system 606 in FIG. 6) can then divide the three-dimensional space into eight sub-areas.

For each respective sub-area, the data encoding system (e.g., data encoding system 606 in FIG. 6) can determine whether the respective sub-area includes at least one point in the point cloud data. In response to determining that the sub-area includes at least one point in the point cloud data, the data encoding system (e.g., data encoding system 606 in FIG. 6) can add a node representing the respective sub-area as a child node of the initial node in the tree-based data structure. The data encoding system (e.g., data encoding system 606 in FIG. 6) can determine whether the respective sub-area includes more than one point in the point cloud data. In response to determining that the sub-area includes at least on point in the point cloud data, the data encoding system (e.g., data encoding system 606 in FIG. 6) can recursively subdivide the respective sub-areas of the child nodes until no resulting child nodes are associated with a sub-area that represent more than one point in the point cloud data.

In some examples, the tree-based data structure can be structured such that each node in the tree-based data structure has a parent node and one or more children nodes. The tree-based data structure can be an octree that is structured such that each node has up to eight child nodes. Using an octree can be especially advantageous because the number of nodes matches well with dividing the three-dimensional space into eight equally spaced sub-areas.

In some examples, a respective node is associated with an area in the point cloud data and any child nodes of the respective node are associated with a sub-area within the area in the point cloud data associated with the respective node.

The data encoding system (e.g., data encoding system 606 in FIG. 6) can generate, at 706, a serial representation of the data by traversing the tree-based data structure and adding a plurality of symbols to a serial data structure, each symbol representing a node in the tree-based data structure. The serial representation can be a stream of bytes (one 8-bit symbol associated with each node). In some examples, each symbol is an eight-bit value representing the occupancy of eight sub-areas within the area represented by the respective node. The tree-based structure can be traversed in a breadth-first manner. A breadth-first traversal of a tree can be a traversal that accesses each node at a particular level before moving to lower levels. The depth-first traversal of a tree can be a traversal that recursively accesses the child nodes of each node before moving onto other nodes in the same level.

The data encoding system (e.g., data encoding system 606 in FIG. 6) can, at 708, perform a process for each respective node represented by a symbol in the serial representation. The data encoding system (e.g., data encoding system 606 in FIG. 6) can, at 710, determine contextual information for the respective node. The contextual information can include at least one of: a location represented by the respective node, an index of the respective node, a level of the respective node in the tree-based structure, or occupancy data of the parent node of the respective node.

The data encoding system (e.g., data encoding system 606 in FIG. 6) can generate, at 712, using the contextual information as input to a machine-learned model, a statistical distribution associated with the respective node. In some examples, the machine-learned model is a multi-layer perceptron. Intermediate layers in the multi-layer perceptron can produce an intermediate representation of the contextual information that is usable as input to subsequent layers.

In some examples, the multi-layer perceptron can include a plurality of levels. The data encoding system (e.g., data encoding system 606 in FIG. 6) can aggregate an intermediate representation of the contextual information of at least one parent node of the respective node with intermediate representations of the respective node as input to a layer in the multi-layer perceptron. In some examples, the multi-layer perceptron can comprise three layers.

The data encoding system (e.g., data encoding system 606 in FIG. 6) can generate, at 714, a compressed representation of the symbol associated with the respective node by encoding the symbol using the statistical distribution for the respective node. The data encoding system (e.g., data encoding system 606 in FIG. 6) can generate a coded version of the respective symbol using an entropy encoder. In some examples, the entropy encoder using an adaptive arithmetic encoding algorithm.

The data encoding system (e.g., data encoding system 606 in FIG. 6) can generate, at 716, a compressed bitstream by sequentially ordering a plurality of compressed representations associated with the plurality of symbols. In some examples, the compressed bitstream is stored for later analysis. In other examples, the compressed bitstream can be transmitted to another component of the computing system for decoding. In response to a request to analyze the compressed bitstream, the data encoding system can decode the compressed bitstream to extract the point cloud data.

In some examples, decoding can include reconstructing the tree-based data structure by sequentially decoding the plurality of compressed representations associated with the plurality of symbols. To do so a data decoding system can, for each respective compressed representation associated with the plurality of symbols, determine contextual information for the respective compressed representation. The contextual information, as noted above, is information that can be accessed without any knowledge of the contents of a particular symbol. As such, the decoding system has access to the same contextual information that is available to the data encoding system.

The data decoding system can generate, using the contextual information as input to a machine-learned model, a statistical distribution associated with the respective compressed representation. The statistical distribution for the respective compressed representation should be identical to the statistical distribution produced by the data encoding system because they both use the same contextual information as input.

The data decoding system can generate an uncompressed symbol based on the respective compressed representation by decoding the compressed representation using the statistical distribution for the compressed representation. The data decoding system can generate a second tree-based structure using a plurality of uncompressed symbols as nodes such that the second tree-based structure is identical to the original tree-based structure before it was encoded.

Figure 8:
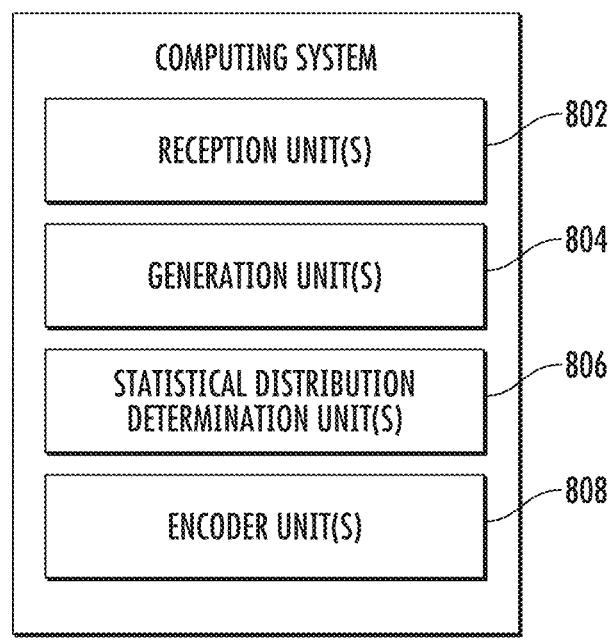
FIG. 8 depicts an example system with units for performing operations and functions according to example aspects of the present disclosure.

FIG. 8 depicts an example system with units for performing operations and functions according to example aspects of the present disclosure. Various means can be configured to perform the methods and processes described herein. For example, a computing system can include a reception unit(s) 802, generation unit(s) 804, statistical distribution determination unit(s) 806, encoder unit(s) 808, and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to receive point cloud data for a three-dimensional space. For example, a LIDAR sensor associated with an autonomous vehicle can capture point cloud data for a space around the autonomous vehicle and provide that data to a data encoding system. A reception unit 802 is one example of a means for receiving point cloud data for a three-dimensional space.

The means can be configured to generate a tree-based data structure from the point cloud data. The tree-based data structure can include a plurality of nodes organized in a hierarchical structure. Each node can represent a particular area of the three-dimensional space. For example, the data encoding system can divide the original three-dimensional space into eight sub-areas. Each sub-area can then be divided further into sub-areas if the sub-area is determined to include at least one point from the data point cloud data. The areas can be recursively divided until either a minimum size is reached or until only one point is represented by any sub-area node. A generation unit 804 is one example of a means for generating a tree-based data structure from the point cloud data, the tree-based data structure comprising a plurality of nodes organized in a hierarchical structure, each node representing a particular area of the three-dimensional space.

The means can be configured to generate, using contextual information as input to a machine-learned model, a statistical distribution associated with the respective node. For example, the data encoding system can use a model to determine, for each node, an estimated statistical distribution associated with that node. A statistical distribution determination unit 806 is one example of a means for generating, using contextual information as input to a machine-learned model, a statistical distribution associated with the respective node.

The means can be configured to generate a compressed bitstream by sequentially ordering a plurality of compressed representations associated with the plurality of symbols. For example, the data encoding system can access compressed representations of the symbols and stream them in order to create a serialized encoded bitstream. An encoder unit 808 is one example of a means for generating a compressed bitstream by sequentially ordering a plurality of compressed representations associated with the plurality of symbols.

Figure 9:
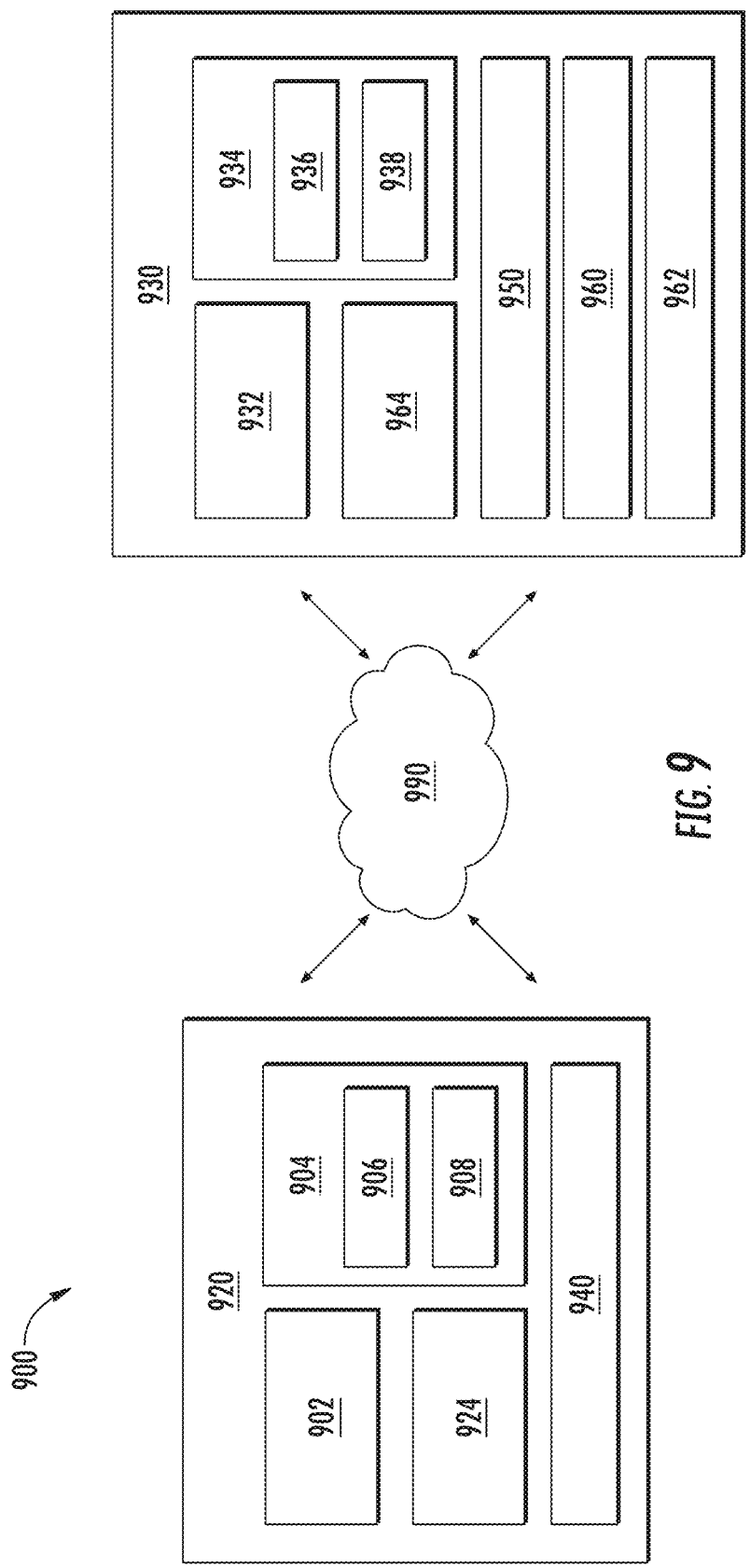
FIG. 9 depicts example system components according to example aspects of the present disclosure.

FIG. 9 depicts a block diagram of an example computing system 900 according to example embodiments of the present disclosure. The example system 900 includes a computing system 920 and a machine learning computing system 930 that are communicatively coupled over a network 990.

In some implementations, the computing system 920 can perform a method for generating entropy encoded representations of point cloud data. In some implementations, the computing system 920 can be included in an autonomous vehicle. For example, the computing system 920 can be on-board the autonomous vehicle. In other implementations, the computing system 920 is not located on-board the autonomous vehicle. For example, the computing system 920 can operate offline to generate entropy encoded representations of point cloud data. The computing system 920 can include one or more distinct physical computing devices.

The computing system 920 includes one or more processors 902 and a memory 904. The one or more processors 902 can be any suitable processing device (e.g., a processor core, a microprocessor, an ASIC, a FPGA, a controller, a microcontroller, etc.) and can be one processor or a plurality of processors that are operatively connected. The memory 904 can include one or more non-transitory computer-readable storage media, such as RAM, ROM, EEPROM, EPROM, one or more memory devices, flash memory devices, etc., and combinations thereof.

The memory 904 can store information that can be accessed by the one or more processors 902. For instance, the memory 904 (e.g., one or more non-transitory computer-readable storage mediums, memory devices) can store data 906 that can be obtained, received, accessed, written, manipulated, created, and/or stored. The data 906 can include, for instance, LIDAR point cloud data, encoded bitstream representation of the LIDAR cloud data, contextual information, and statistical distribution data as described herein. In some implementations, the computing system 920 can obtain data from one or more memory device(s) that are remote from the system 920.

The memory 904 can also store computer-readable instructions 908 that can be executed by the one or more processors 902. The instructions 908 can be software written in any suitable programming language or can be implemented in hardware. Additionally, or alternatively, the instructions 908 can be executed in logically and/or virtually separate threads on processor(s) 902.

For example, the memory 904 can store instructions 908 that when executed by the one or more processors 902 cause the one or more processors 902 to perform any of the operations and/or functions described herein, including, for example, receiving point cloud data for a three-dimensional space, generating a tree-based data structure from the point cloud data, the tree-based data structure comprising a plurality of nodes organized in a hierarchical structure, each node representing a particular area of the three-dimensional space, generating a serial representation of the data by traversing the tree-based data structure and adding a plurality of symbols to a serial data structure, each symbol representing a node in the tree-based data structure, determining contextual information for the respective node, generating, using the contextual information as input to a machine-learned model, a statistical distribution associated with the respective node, generating a compressed representation of the symbol associated with the respective node by encoding the symbol using the statistical distribution for the respective node, and generating a compressed bitstream by sequentially ordering a plurality of compressed representations associated with the plurality of symbols.

According to an aspect of the present disclosure, the computing system 920 can store or include one or more machine-learned models 940. As examples, the machine-learned models 940 can be or can otherwise include various machine-learned models such as, for example, neural networks (e.g., deep neural networks), multi-layer perceptrons, support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks), convolutional neural networks, or other forms of neural networks.

In some implementations, the computing system 920 can receive the one or more machine-learned models 940 from the machine learning computing system 930 over network 990 and can store the one or more machine-learned models 940 in the memory 904. The computing system 920 can then use or otherwise implement the one or more machine-learned models 940 (e.g., by processor(s) 902). In particular, the computing system 920 can implement the machine learned model(s) 940 to generate entropy encoded representations of point cloud data.

The machine learning computing system 930 includes one or more processors 932 and a memory 934. The one or more processors 932 can be any suitable processing device (e.g., a processor core, a microprocessor, an ASIC, a FPGA, a controller, a microcontroller, etc.) and can be one processor or a plurality of processors that are operatively connected. The memory 934 can include one or more non-transitory computer-readable storage media, such as RAM, ROM, EEPROM, EPROM, one or more memory devices, flash memory devices, etc., and combinations thereof.

The memory 934 can store information that can be accessed by the one or more processors 932. For instance, the memory 934 (e.g., one or more non-transitory computer-readable storage mediums, memory devices) can store data 936 that can be obtained, received, accessed, written, manipulated, created, and/or stored. The data 936 can include, for instance, LIDAR point cloud data, encoded bitstream representation of the LIDAR cloud data, contextual information, and statistical distribution data as described herein. In some implementations, the machine learning computing system 930 can obtain data from one or more memory device(s) that are remote from the system 930.

The memory 934 can also store computer-readable instructions 938 that can be executed by the one or more processors 932. The instructions 938 can be software written in any suitable programming language or can be implemented in hardware. Additionally, or alternatively, the instructions 938 can be executed in logically and/or virtually separate threads on processor(s) 932.

For example, the memory 934 can store instructions 938 that when executed by the one or more processors 932 cause the one or more processors 932 to perform any of the operations and/or functions described herein, including, for example, receiving point cloud data for a three-dimensional space, generating a tree-based data structure from the point cloud data, the tree-based data structure comprising a plurality of nodes organized in a hierarchical structure, each node representing a particular area of the three-dimensional space, generating a serial representation of the data by traversing the tree-based data structure and adding a plurality of symbols to a serial data structure, each symbol representing a node in the tree-based data structure, determining contextual information for the respective node, generating, using the contextual information as input to a machine-learned model, a statistical distribution associated with the respective node, generating a compressed representation of the symbol associated with the respective node by encoding the symbol using the statistical distribution for the respective node, and generating a compressed bitstream by sequentially ordering a plurality of compressed representations associated with the plurality of symbols.

In some implementations, the machine learning computing system 930 includes one or more server computing devices. If the machine learning computing system 930 includes multiple server computing devices, such server computing devices can operate according to various computing architectures, including, for example, sequential computing architectures, parallel computing architectures, or some combination thereof.

In addition or alternatively to the model(s) 940 at the computing system 920, the machine learning computing system 930 can include one or more machine-learned models 950. As examples, the machine-learned models 950 can be or can otherwise include various machine-learned models such as, for example, neural networks (e.g., deep neural networks), support vector machines, decision trees, ensemble models, k-nearest neighbors models, multi-layer perceptrons, Bayesian networks, or other types of models including linear models and/or non-linear models. Example neural networks include feed-forward neural networks, recurrent neural networks (e.g., long short-term memory recurrent neural networks), convolutional neural networks, or other forms of neural networks.

As an example, the machine learning computing system 930 can communicate with the computing system 920 according to a client-server relationship. For example, the machine learning computing system 950 can implement the machine-learned models 950 to provide a web service to the computing system 920. For example, the web service can provide support to an autonomous vehicle.

Thus, machine-learned models 940 can located and used at the computing system 920 and/or machine-learned models 950 can be located and used at the machine learning computing system 930.

In some implementations, the machine learning computing system 930 and/or the computing system 920 can train the machine-learned models 940 and/or 950 through use of a model trainer 960. The model trainer 960 can train the machine-learned models 940 and/or 950 using one or more training or learning algorithms. One example training technique is backwards propagation of errors. In some implementations, the model trainer 960 can perform supervised training techniques using a set of labeled training data. In other implementations, the model trainer 960 can perform unsupervised training techniques using a set of unlabeled training data. The model trainer 960 can perform a number of generalization techniques to improve the generalization capability of the models being trained. Generalization techniques include weight decays, dropouts, or other techniques.

In particular, the model trainer 960 can train a machine-learned model 940 and/or 950 based on a set of training data 962. The training data 962 can include, for example, data associated with the statistical distribution of 8-bit occupancy values that represent point cloud data. The model trainer 960 can be implemented in hardware, firmware, and/or software controlling one or more processors.

The computing system 920 can also include a network interface 924 used to communicate with one or more systems or devices, including systems or devices that are remotely located from the computing system 920. The network interface 924 can include any circuits, components, software, etc. for communicating with one or more networks (e.g., 990). In some implementations, the network interface 924 can include, for example, one or more of a communications controller, receiver, transceiver, transmitter, port, conductors, software and/or hardware for communicating data. Similarly, the machine learning computing system 930 can include a network interface 964.

The network(s) 990 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 990 can be accomplished, for instance, via a network interface using any type of protocol, protection scheme, encoding, format, packaging, etc.

Computing tasks discussed herein as being performed at computing device(s) remote from the autonomous vehicle can instead be performed at the autonomous vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

Aspects of the disclosure have been described in terms of illustrative embodiments thereof. Numerous other embodiments, modifications, and/or variations within the scope and spirit of the appended claims can occur to persons of ordinary skill in the art from a review of this disclosure. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure cover such alterations, variations, and/or equivalents.

What is claimed is:

1. A computer-implemented method for generating entropy encoded representations of point cloud data, the method comprising:
   receiving, by a computing system including one or more processors, point cloud data for a three-dimensional space;
   generating, by the computing system, a tree-based data structure from the point cloud data, the tree-based data structure comprising a plurality of nodes organized in a hierarchical structure, each node representing a particular area of the three-dimensional space;
   generating, by the computing system, a serial representation of the data by traversing the tree-based data structure and adding a plurality of symbols to a serial data structure, each symbol representing a node in the tree-based data structure;
   for each respective node represented by a symbol in the serial representation:
      determining, by the computing system, contextual information for the respective node,
      generating, by the computing system and using the contextual information as input to a machine-learned model, a statistical distribution associated with the respective node, wherein the machine-learned model is a multi-layer perceptron and intermediate layers in the multi-layer perceptron produce an intermediate representation of the contextual information that is usable as input to subsequent layers; and
      generating, by the computing system, a compressed representation of the symbol associated with the respective node by encoding the symbol using the statistical distribution for the respective node, and
   generating, by the computing system, a compressed bitstream by sequentially ordering a plurality of compressed representations associated with the plurality of symbols.

2. The computer-implemented method of claim 1, wherein the point cloud data is generated via a LIDAR sensor associated with an autonomous vehicle, and wherein the method further comprises:
   accessing, by the computing system, the compressed bitstream;
   identifying, by the computing system, one or more objects within a surrounding environment of the autonomous vehicle;
   generating, by the computing system, a trajectory for the autonomous vehicle based at least in part on the one or more objects; and
   implementing, by the computing system, a motion control for the autonomous vehicle to travel in accordance with the trajectory.

3. The computer-implemented method of claim 1, wherein the tree-based data structure is structured such that each node in the tree-based data structure has a parent node and one or more children nodes.

4. The computer-implemented method of claim 3, wherein the tree-based data structure is an octree and is structured such that each node has up to eight child nodes.

5. The computer-implemented method of claim 1, wherein a respective node is associated with an area in the point cloud data and any child nodes of the respective node are associated with a sub-area within the area in the point cloud data associated with the respective node.

6. The computer-implemented method of claim 1, wherein generating a tree-based data structure from the point cloud data comprises:
   establishing, by the computing system, an initial node representing the three-dimensional space represented by the point cloud data;
   dividing, by the computing system, the three-dimensional space into eight sub-areas; and
   for each respective sub-area:
      determining, by the computing system, whether the respective sub-area includes at least one point in the point cloud data;

in response to determining that the sub-area includes at least one point in the point cloud data, adding, by the computing system, a node representing the respective sub-area as a child node of the initial node in the tree-based data structure;

determining, by the computing system, whether the respective sub-area includes more than one point in the point cloud data; and in response to determining that the sub-area includes at least on point in the point cloud data, recursively subdividing, by the computing system, the respective sub-areas of the child nodes until no resulting child nodes are associated with a sub-area that represent more than one point in the point cloud data.

7. The computer-implemented method of claim 1, wherein a symbol is an eight-bit value representing an occupancy of eight sub-areas within the area represented by the respective node.

8. The computer-implemented method of claim 1, wherein contextual information includes at least one of: a location represented by the respective node, an index of the respective node, a level of the respective node in the tree-based structure, or occupancy data of the parent node of the respective node.

9. The computer-implemented method of claim 1, wherein multi-layer perceptron includes a plurality of levels and generating, using the contextual information as input to a machine-learned model, a statistical distribution associated with the respective node further comprises:

aggregating, by the computing system, an intermediate representation of contextual information of at least one parent node of the respective node with intermediate representations of the respective node as input to a layer in the multi-layer perceptron.

10. The computer-implemented method of claim 9, wherein the multi-layer perceptron comprises three layers.

11. The computer-implemented method of claim 1, wherein encoding the respective symbol using the statistical distribution comprises:

generating, by the computing system, a coded version of the respective symbol using an entropy encoder.

12. The computer-implemented method of claim 11, wherein the entropy encoder can use an adaptive arithmetic encoding algorithm.

13. A computing system comprising:
one or more processors;
a memory comprising one or more computer-readable media, the memory storing computer-readable instructions that when executed by the one or more processors cause the one or more processors to perform operations comprising:
receiving point cloud data for a three-dimensional space;
generating a tree-based data structure from the point cloud data, the tree-based data structure comprising a plurality of nodes organized in a hierarchical structure, each node representing a particular area of the three-dimensional space;
generating a serial representation of the data by traversing the tree-based data structure and adding a plurality of symbols to a serial data structure, each symbol representing a node in the tree-based data structure;
for each respective node represented by a symbol in the serial representation:
determining contextual information for the respective node;
generating, using the contextual information as input to a machine-learned model, a statistical distribution associated with the respective node, wherein the machine-learned model is a multi-layer perceptron and intermediate layers in the multi-layer perceptron produce an intermediate representation of the contextual information that is usable as input to subsequent layers; and
generating a compressed representation of the symbol associated with the respective node by encoding the symbol using the statistical distribution for the respective node; and
generating a compressed bitstream by sequentially ordering a plurality of compressed representations associated with the plurality of symbols.

14. The computing system of claim 13, the operations further comprising:
in response to a request to analyze the compressed bitstream, decoding the compressed bitstream to extract the point cloud data.

15. The computing system of claim 13, wherein the point cloud data include intensity values for points in the point cloud data.

16. The computing system of claim 13, wherein the contextual information for the respective node can include information based on point cloud data from a previous time period.

17. A non-transitory computer-readable medium storing instruction that, when executed by one or more computing devices, cause the one or more computing devices to perform operations, the operations comprising:
receiving point cloud data for a three-dimensional space;
generating a first tree-based data structure from the point cloud data, the first tree-based data structure comprising a plurality of nodes organized in a hierarchical structure, each node representing a particular area of the three-dimensional space;
generating a serial representation of the data by traversing the first tree-based data structure and adding a plurality of symbols to a serial data structure, each symbol representing a node in the tree-based data structure;
for each respective node represented by a symbol in the serial representation:
determining contextual information for the respective node;
generating, using the contextual information as input to a machine-learned model, a statistical distribution associated with the respective node, wherein the machine-learned model is a multi-layer perceptron and intermediate layers in the multi-layer perceptron produce an intermediate representation of the contextual information that is usable as input to subsequent layers; and
generating a compressed representation of the symbol associated with the respective node by encoding the symbol using the statistical distribution for the respective node; and
generating a compressed bitstream by sequentially ordering a plurality of compressed representations associated with the plurality of symbols;
decoding the plurality of compressed representations associated with the plurality of symbols, wherein decoding comprises:
for each respective compressed representation associated with the plurality of symbols:
determining contextual information for the respective compressed representation;

generating, using the contextual information as input to a machine-learned model, a statistical distribution associated with the respective compressed representation; and generating an uncompressed symbol based on the respective compressed representation by decoding the compressed representation using the statistical distribution for the compressed representation; and generating a second tree-based structure using a plurality of uncompressed symbols as nodes such that the second tree-based structure is identical to the first tree-based structure.

18. The non-transitory computer-readable medium of claim 17, wherein a symbol is an eight-bit value representing an occupancy of eight sub-areas within the area represented by the respective node.

* * * * *